US009603078B2

(12) United States Patent
Kapoulas et al.

(10) Patent No.: US 9,603,078 B2
(45) Date of Patent: *Mar. 21, 2017

(54) METHOD AND APPARATUS FOR MANAGING HANDOVERS IN A WIRELESS NETWORK BASED ON SPEED GROUP ASSIGNMENTS

(71) Applicant: AT&T MOBILITY II LLC, Atlanta, GA (US)

(72) Inventors: Spyridon Kapoulas, New York, NY (US); Kurt Huber, Kennesaw, GA (US); Thomas W. Henderson, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,509

(22) Filed: Aug. 17, 2016

(65) Prior Publication Data
US 2016/0360465 A1 Dec. 8, 2016

Related U.S. Application Data

(63) Continuation of application No. 14/082,769, filed on Nov. 18, 2013, now Pat. No. 9,451,521.

(51) Int. Cl.
*H04W 36/32* (2009.01)
*H04W 36/00* (2009.01)
(Continued)

(52) U.S. Cl.
CPC .......... *H04W 36/32* (2013.01); *H04B 17/318* (2015.01); *H04W 36/0061* (2013.01);
(Continued)

(58) Field of Classification Search
None
See application file for complete search history.

(56) References Cited

U.S. PATENT DOCUMENTS 7,120,440 B2  10/2006  Cho et al.
8,320,359 B2  11/2012  Lindoff et al.
(Continued)

FOREIGN PATENT DOCUMENTS

EP    2568748 A1    3/2013
JP    2010050804 A    3/2010
(Continued)

OTHER PUBLICATIONS

Eastwood, Les et al., "Mobility Using IEEE 802.21 in a Heterogeneous IEEE 802.16/802.11-Based, IMT-Advanced (4G) Network", IEEE, 2008.
(Continued)

*Primary Examiner* — Charles Appiah
*Assistant Examiner* — Margaret G Mastrodonato
(74) *Attorney, Agent, or Firm* — Guntin & Gust, PLC; Robert Gingher

(57) ABSTRACT

A system that incorporates the subject disclosure may include, for example, determining a mobility speed group assignment for a mobile communication device having a radio resource control connection with a wireless network where the mobility speed group assignment is selected from among a plurality of mobility speed groups according to a speed of the mobile communication device, determining a cell size for a serving cell of the wireless network that is providing the radio resource control connection, and selecting a handover policy based on the mobility speed group assignment and the cell size. Other embodiments are disclosed.

20 Claims, 23 Drawing Sheets

(51) Int. Cl.
*H04W 36/36* (2009.01)
*H04W 36/30* (2009.01)
*H04W 24/02* (2009.01)
*H04B 17/318* (2015.01)

(52) U.S. Cl.
CPC ... *H04W 36/0083* (2013.01); *H04W 36/0094* (2013.01); *H04W 36/30* (2013.01); *H04W 24/02* (2013.01); *H04W 36/36* (2013.01)

(56) References Cited

U.S. PATENT DOCUMENTS

| | | |
|---|---|---|
| 8,369,857 B2 | 2/2013 | Dimou et al. |
| 2006/0286937 A1 | 12/2006 | Russell et al. |
| 2007/0161347 A1 | 7/2007 | Ma et al. |
| 2009/0005029 A1 | 1/2009 | Wang et al. |
| 2010/0080178 A1 | 4/2010 | Cox et al. |
| 2011/0263260 A1 | 10/2011 | Yavuz et al. |
| 2012/0039226 A1 | 2/2012 | Yang et al. |
| 2012/0039299 A1 | 2/2012 | Teyeb et al. |
| 2012/0108252 A1 | 5/2012 | Dimou et al. |
| 2012/0178455 A1 | 7/2012 | Sato |
| 2012/0250602 A1 | 10/2012 | Ou et al. |
| 2012/0314570 A1 | 12/2012 | Forenza et al. |
| 2012/0315915 A1 | 12/2012 | Ohm et al. |
| 2012/0320817 A1 | 12/2012 | Xu et al. |
| 2013/0028128 A1 | 1/2013 | Novak et al. |
| 2013/0053025 A1 | 2/2013 | Lindoff et al. |
| 2013/0064220 A1 | 3/2013 | Yin |
| 2013/0109387 A1 | 5/2013 | Tinnakornsrisuphap et al. |
| 2013/0143503 A1 | 6/2013 | Li et al. |
| 2013/0150053 A1 | 6/2013 | Hwang et al. |
| 2013/0210435 A1 | 8/2013 | Dimou et al. |
| 2014/0141785 A1 | 5/2014 | Wang et al. |

FOREIGN PATENT DOCUMENTS

| | | |
|---|---|---|
| WO | 2010057331 A1 | 5/2010 |
| WO | 2012031619 A1 | 3/2012 |

OTHER PUBLICATIONS

Hu, Fei et al., "Priority-Determined Multiclass Handoff Scheme With Guaranteed Mobile QoS in Wireless Multimedia Networks", IEEE Transactions on Vehicular Technology, vol. 53, No. 1, Jan. 2004, 118-135.

Mohanty, Shantidev et al., "A Cross-Layer (Layer 2+3) Handoff Management Protocol for Next-Generation Wireless Systems", IEEE Transactions on Mobile Computing, vol. 5, No. 10, Oct. 2006, 1347-1360.

Yan, Xiaohuan et al., "A survey of vertical handover decision algorithms in Fourth Generation heterogeneous wireless networks", Computer Networks, 2010, 1848-1863.

100

400

500

600

700

800

900

1000

1100

1200

| Deployment driven by | Metrocell Placement | Problem that small cell aims to solve | Venue / Location |
|---|---|---|---|
| Coverage | Indoor | Lack of dominance on the upper floors of a high rise building | High rise building in a heavy urban environment. |
| | | Poor macro RF coverage | In building areas where macro coverage is weak or non-existent, i.e. underground parking |
| | Outdoor | Poor macro RF coverage and/or quality | Areas where nearest macro tower is far away, or areas where there is lack of dominance. |
| Capacity | Indoor | High concentration of indoor users. | Stadium, convention center, office building, etc. |
| | Outdoor | High concentration of outdoor users. | Public square, stadium parking lot, downtown area, etc. |

| Neighboring cell type | Pool of PCIs |
|---|---|
| Macro cell | PCI(0)- PCI(j) |
| Small cell (Coverage) | PCI(k)-PCI(l) |
| Small cell (Capacity) | PCI(m)-PCI(503) |

| Parameter | Low speed | Medium speed | High speed |
|---|---|---|---|
| RRC Measurement Report triggering event | A5_1 & A5_2 | A5_1 & A5_2 | A5_1 & A5_2 |
| Time to Trigger (TTT), | ms2560 | ms320 | ms64 |
| DRX | ON | Suspend | Suspend |
| gapOffset | gp0 | gp1 | gp1 |
| physCellIdRange | Null | Null | PCI(m)-PCI(503) |
| measCycleSCell | sf160 | sf256 | sf256 |
| filterCoefficientRSRP | fc9 | fc5 | fc1 |
| filterCoefficientRSRQ | fc9 | fc5 | fc1 |

METHOD AND APPARATUS FOR MANAGING HANDOVERS IN A WIRELESS NETWORK BASED ON SPEED GROUP ASSIGNMENTS

CROSS-REFERENCE TO RELATED APPLICATION(S)

This application is a continuation of and claims priority to U.S. patent application Ser. No. 14/082,769, filed Nov. 18, 2013, the disclosure of which is hereby incorporated by reference herein in its entirety.

FIELD OF THE DISCLOSURE

The subject disclosure relates to a method and apparatus for managing handovers in a wireless network.

BACKGROUND

Wireless communication for mobile devices on the move is based in part on handovers between a serving cell and a target cell. According to the $3^{rd}$ Generation Partnership Project (3GPP) Technical Specification 36.331, an end user device in an RRC_CONNECTED mode monitors the number of occurring handovers within a time interval (i.e., TCRmax) to detect changes in its mobility state. Assuming num_HOs handover events within TCRmax, the end user device moves to medium mobility if NCR_H>num_HOs>NCR_M and to high mobility state if num_HOs>NCR_H. Once the mobility state has been determined, the Radio Resource Control (RRC) parameter timeToTrigger is scaled by a speed dependent factor (i.e., sf-Medium or sf-High).

BRIEF DESCRIPTION OF THE DRAWINGS

Reference will now be made to the accompanying drawings, which are not necessarily drawn to scale, and wherein:

FIGS. 13-14 depict illustrative embodiments of cell deployment and cell pool assignments;

FIG. 15 depicts an illustrative embodiment of parameter assignments according to a speed-based policy;

DETAILED DESCRIPTION

Figure 1:
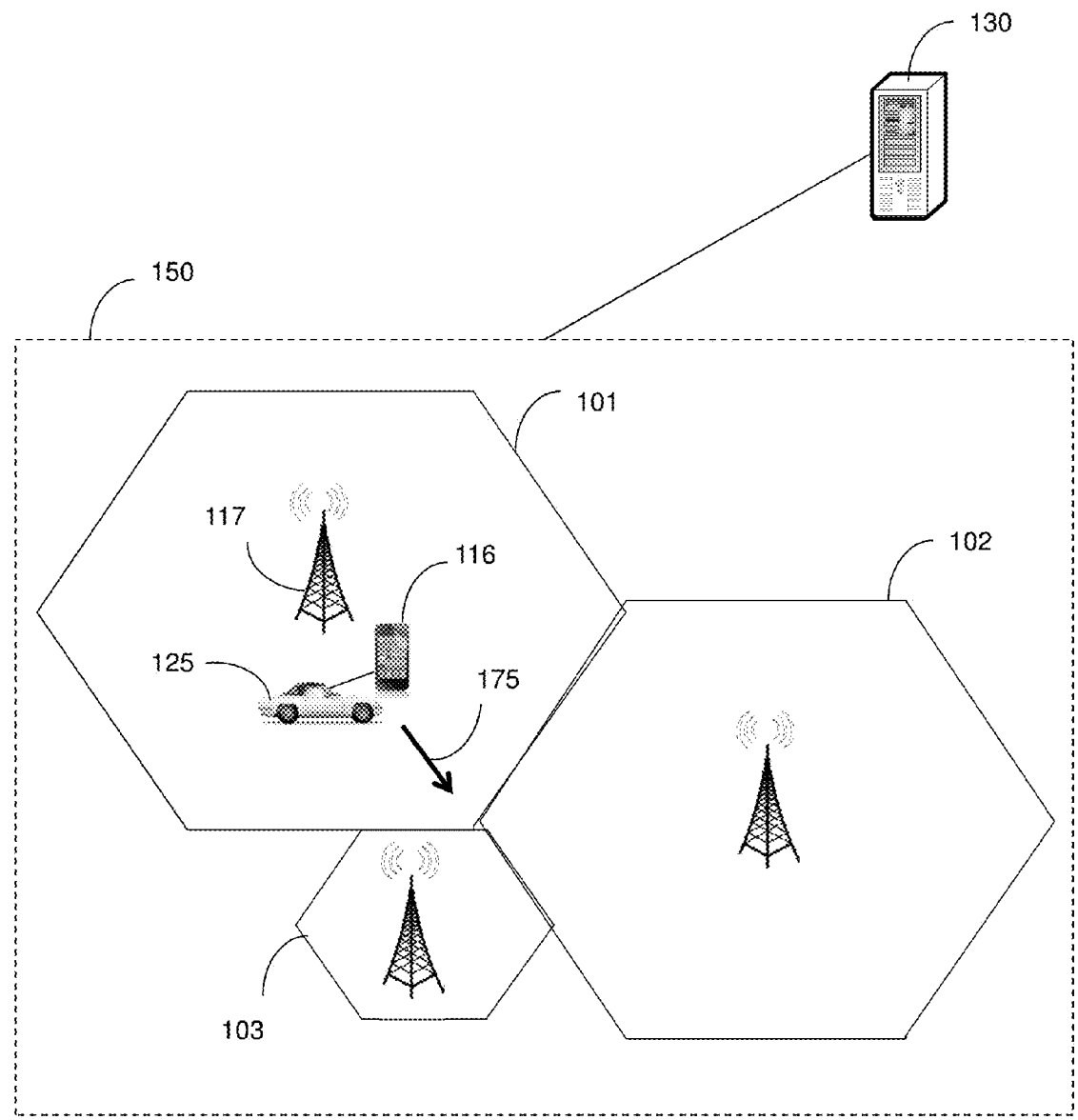
FIG. 1 depicts an illustrative embodiment of a communication system that provides wireless communication services.

The subject disclosure describes, among other things, illustrative embodiments of performing handovers based on speed group assignments that are performed according to speed and/or acceleration measurements of an end user device. A speed group assignment can be used in conjunction with one or more of cell size, cell type and service type to generate or otherwise select a handover policy. The selected handover policy can facilitate the handover to reduce Radio Link Failures (RLFs). The exemplary embodiments can distribute or otherwise provide neighboring cell information to UEs that are in need of a handover to facilitate handover calculations and processing by the UE. In one or more embodiments, handover parameters and their associated values (hereinafter referred to as handover parameters) can be assigned to or otherwise correspond to different mobility speed groups so that calculations by the UE (of the handover parameters) are reduced which saves UE resources and reduces the time of determination for the handover.

In one embodiment, the speed measurements can be obtained without changes being necessary at the UE. In one embodiment, the system and methods can utilize network-based UE speed measurements; UE speed group management; neighbor cell type information; and/or UE speed specific handover parameters policies to implement the handovers. One or more of the exemplary embodiments can apply UE and/or service specific handover parameter profiles that are based in whole or in part on an assigned speed group. One or more of the exemplary embodiments can improve the time interval used for UE measurements, filtering and handover event triggering, such as for medium to high speed vehicular UEs. One or more of the exemplary embodiments can prevent high speed vehicular UEs from handing over to a small cell when adequate macro cell coverage is available. One or more of the exemplary embodiments can reduce excessive signaling and delay by implementing a network-based UE speed estimation.

Other embodiments are included in the subject disclosure.

One or more of the exemplary embodiments described herein are related to embodiments described in co-pending U.S. patent application entitled "Method and Apparatus for Managing Handovers in a Wireless Network", Attorney Docket No. 2013-0858_7785-1021, the disclosure of which is hereby incorporated by reference in its entirety.

One embodiment of the subject disclosure is a method that includes determining, by a system including a processor, a mobility speed group assignment for a mobile communication device having a radio resource control connection with a wireless network, where the mobility speed group assignment is selected from among a plurality of mobility speed groups according to a speed and an acceleration of the mobile communication device. The method can include determining, by the system, a cell size for a serving cell of the wireless network that is providing the radio resource control connection. The method can include selecting, by the system, a handover policy based on the mobility speed group assignment and the cell size, wherein the handover policy includes handover parameters and their associated values (hereinafter referred to as handover parameters). The method can include performing, by the system, a handover from the serving cell to a target cell based on the handover policy.

One embodiment of the subject disclosure includes a server that has a memory to store executable instructions, and a processor coupled with the memory. The processor, responsive to executing the executable instructions, can perform operations including determining a mobility speed group assignment for a mobile communication device having a radio resource control connection with a wireless network, where the mobility speed group assignment is selected from among a plurality of mobility speed groups according to a speed of the mobile communication device. The processor can determine a cell size for a serving cell of the wireless network that is providing the radio resource control connection. The processor can select a handover policy based on the mobility speed group assignment and the cell size.

One embodiment of the subject disclosure includes a computer readable storage device including executable instructions, which, responsive to being executed by a processor cause the processor to perform operations that include determining a mobility speed group assignment for a mobile communication device having a radio resource control connection with a wireless network, where the mobility speed group assignment is selected from among a plurality of mobility speed groups according to a speed of the mobile communication device. The processor can determine a cell type for a serving cell of the wireless network that is providing the radio resource control connection. The processor can select a handover policy based on the mobility speed group assignment and the cell type. The processor can communicate, to the UE or UEs, the handover policy, which can consist of the handover parameters and their associated values, such as via a radio resource control (RRC) signaling message or messages.

One embodiment of the subject disclosure is a method that includes detecting, by a system including a processor, a mobile communication device having a radio resource control connection with a wireless network; and monitoring, by the system, for a first triggering event associated with the mobile communication device. The method can include, responsive to the first triggering event, monitoring, by the system, a speed and an acceleration of the mobile communication device in a serving cell of the wireless network. The method can include selecting, by the system, a first mobility speed group from among a plurality of mobility speed groups based on the speed and the acceleration of the mobile communication device, where handover parameters and their associated values are assigned to each speed group of the plurality of mobility speed groups, and where the handover parameters facilitate a handover by the wireless network from the serving cell to a target cell. The method can include the forwarding of the handover parameters and their associated values to the UE or UEs via dedicated RRC signaling message or messages.

One embodiment of the subject disclosure includes a server that has a memory to store executable instructions, and a processor coupled with the memory. The processor, responsive to executing the executable instructions, can perform operations including detecting a mobile communication device having a radio resource control connection with a wireless network. The processor can monitor a speed and an acceleration of the mobile communication device in a serving cell of the wireless network. The processor can select a first mobility speed group from among a plurality of mobility speed groups based on the speed and the acceleration of the mobile communication device, where handover parameters are assigned to each speed group of the plurality of mobility speed groups, and where the handover parameters and their associated values facilitate a handover by the wireless network from the serving cell to a target cell.

One embodiment of the subject disclosure includes a computer readable storage device including executable instructions, which, responsive to being executed by a processor cause the processor to perform operations that include monitoring a speed and an acceleration of a mobile communication device in a serving cell of a wireless network, where the mobile communication device has a radio resource control connection with the wireless network. The processor can select a first mobility speed group from among a plurality of mobility speed groups based on the speed and the acceleration of the mobile communication device, where handover parameters and their associated values are assigned to each speed group of the plurality of mobility speed groups, and where the handover parameters and their associated values facilitate a handover by the wireless network from the serving cell to a target cell.

FIG. 1 depicts an illustrative embodiment of communication system 100 that can provide wireless media services, such as voice, video and/or data services to end user devices, such as communication device 116, utilizing a wireless network 150 (a portion of which is illustrated). In one embodiment, network 150 can be a heterogeneous network having a variety of cell sizes (e.g. macro cells covering large geographical areas, small cells covering small geographical areas, etc.), and mobility profiles (e.g., fast moving UEs, slow moving UEs, stationary UEs, etc.).

System 100 enables the cell size, the cell type, the service type and/or the end user device speed (and/or acceleration) to be taken into account when performing a handover. In one embodiment, system 100 can determine a mobility speed group assignment for the mobile communication device 116 having a radio resource control connection with a wireless network, where the mobility speed group assignment is selected from among a plurality of mobility speed groups according to a speed and/or an acceleration of the mobile communication device. The system 100 can determine a cell size for a serving cell of the wireless network that is providing the radio resource control connection and can select a handover policy based on the mobility speed group assignment and the cell size, where the handover policy includes handover parameters and their associated values. A handover from the serving cell to a target cell can then be performed based on the selected handover policy.

System 100 enables starting handover measurements early enough and prioritizing target cells so that the probability of RLFs related to handovers can be reduced. In order to support timely handovers in a heterogeneous network with a variety of cell sizes and mobility profiles, the speed of UEs can be measured and analyzed along with neighboring cell type information to identify a set of handover parameters to be chosen for each UE. In one embodiment, system 100 enables measuring the speed and/or acceleration for each UE falling into certain measurements criteria or categories. In one embodiment, a UE speed group management can monitor the mobility state for each UE and can assign each UE to a speed group based on speed and/or acceleration measurements. In one embodiment, handover parameters and/or neighboring cell type policy can result in a selection of the appropriate parameter values for each UE and can result in an initiation of an RRC Connection Reconfiguration towards the UE. In one embodiment, these three functions can be performed at an eNodeB (or other network element(s)) and there is no additional functionality required at the UE.

Device 116 is depicted as a mobile smart phone, but the exemplary embodiments can be any type of communication device that provides wireless communications such as a tablet, a laptop computer, a PDA and so forth. System 100 can enable communication services over a number of different networks, such as between end user device 116 and another communication device (e.g., a second end user device) not shown. In this embodiment, the communication device 116 is in motion, as depicted by arrow 175, as a result of being with a user in a vehicle 125. The exemplary embodiments can be applied to wireless devices that are in various states of motion (e.g., high speed, medium speed, low speed, pedestrian, non-moving, and so forth).

Multiple forms of media services can be offered to media devices by way of wireless access base stations 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, IEEE 802.11 a/b/g/n/ac/ad and so on. Other present and next generation wide area wireless access network technologies can be used in one or more embodiments of the subject disclosure.

System 100 illustrates cells 101, 102 and 103 which each include a base station 117 for providing wireless services within a coverage area of the cell. In this example, cell 101 is operating as the serving cell and a determination needs to be made as to which cell (e.g., cell 102 or cell 103) is to be the target cell for the handover. Server 130 (e.g., operating as the wireless base station 117 and/or an eNodeB for the wireless network 150) can be used for identifying a UE having an RRC connection, commencing speed and/or acceleration measurements for the identified UE, and assigning the UE to a mobility speed group from among a plurality of such groups based on the speed and/or acceleration measurements. The radio resource control (RRC) connection can be a communication link that has been established between the UE and one or more components of the wireless network, such as an eNodeB.

Server 130 can improve the handover robustness and retainability by providing different mobility speed profiles having different UE and/or service specific handover parameter profiles. The different profiles can be assigned based on different speeds of the UEs. The server 130 can optimize or otherwise improve the time interval, required by UE, used for UE measurements, filtering and handover event triggering, such as for medium to high speed vehicular UEs. The server 130 can prevent high speed vehicular UEs from handing over to a small cell (e.g., cell 103) when adequate macro cell coverage is available (e.g., via cell 102). The server 130 can avoid excessive signaling and delay compared to a UE based solution (e.g., if every time the UE speed changes a report is sent to the eNodeB, then the amount of signaling generated is significant—in addition, this signaling may delay handover execution). In one embodiment, the system 100 reduces handover delay by utilizing the resources of the network for UE speed estimation rather than performing calculation or making other determinations at the UE.

In one or more embodiments, server 130 can detect device 116 having a radio resource control connection with wireless network 150, and can monitor for a first triggering event associated with the mobile communication device. Server 130, responsive to the first triggering event, can monitor a speed and an acceleration of the device 116 in serving cell 101. Server 130 can select a first mobility speed group from among a plurality of mobility speed groups based on the speed and the acceleration of the mobile communication device, where the handover parameters and their associated values are assigned to each speed group of the plurality of mobility speed groups, and where the handover parameters and their associated values facilitate a handover by the wireless network from the serving cell to a target cell.

In one or more embodiments, the monitoring of the speed and the acceleration of the device 116 is based on an analysis by the server 130 (without the device 116 performing the analysis) of a Doppler frequency associated with the radio resource control connection. In one or more embodiments, the monitoring for the first triggering event can be based on average path loss measurements at the serving cell 101, signal quality measurements at the serving cell, load measurements at the serving cell, a measurement of radio link failures for incoming handovers at a neighboring cell, or a combination thereof. In one or more embodiments, the first triggering event can occur prior to a first handover for the radio resource control connection between the device 116 and the wireless network without waiting for a pre-determined number of handovers. In one or more embodiments, the server 130 can detect a change in the speed, the acceleration or a combination thereof, and can select a second mobility speed group from among the plurality of mobility speed groups based on the change.

System 100 can include various components that are not illustrated, including one or more of a Universal Terrestrial Radio Access Network (UTRAN), a Global System for Mobile communications (GSM) Enhanced Data rates for GSM Evolution (EDGE) Radio Access Network, an E-UTRAN and a IEEE 802.11 a/b/g/n/ac/ad. The system 100 can further include one or more of a Serving General packet radio service (GPRS) Support Node (SGSN), and a Mobility Management Entity (MME). Other components not shown can also be utilized for providing communication services to the mobile device 116, such as a Mobile Switching Center (MSC) which can facilitate routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, system 100 can provide for circuit switching fallback for packet switching so as to enable the provisioning of voice and other circuit switching-domain services (e.g., circuit switching UDI video/LCS/USSD) by reuse of circuit switching infrastructure, such as when the device 116 is served by E-UTRAN. In one or more embodiments, a circuit-switching fallback enabled terminal connected to E-UTRAN may use GERAN or UTRAN to connect to the circuit switching-domain. In one or more embodiments, circuit switching fallback and Internet Protocol Multimedia Subsystem (IMS)-based services of system 100 can co-exist in a single service operator's network.

In one or more embodiments, the UTRAN can include node B's and radio network controllers which enable carrying many traffic types including real-time circuit-switched to IP-based packet switched traffic. The UTRAN can also enable connectivity between the device 116 and the core network. The UTRAN can utilize a number of interfaces including Iu, Uu, Iub and/or Iur. In one or more embodiments, the GERAN can facilitate communications between base stations (e.g., Ater and Abis interfaces) and base station controllers (e.g., A interfaces).

In one or more embodiments, the E-UTRAN can be the air interface for the LTE upgrade path for mobile networks according to the relevant family of 3GPP technical specifications. The E-UTRAN can include enodeBs on the network that are connected to each other such as via an X2 interface, which are connectable to the packet switch core network via an S1 interface. For example, the E-UTRAN can use various communication techniques including orthogonal frequency-division multiplexing (OFDM), multiple-input multiple-output (MIMO) antenna technology depending on the capabilities of the terminal, and beamforming for downlink to support more users, higher data rates and lower processing power required on each handset.

In one or more embodiments, the SGSN can assume responsibility for delivery of data packets from and to mobile stations within the SGSN's geographical service or coverage area. The SGSN can perform functions including packet routing and transfer, mobility management (e.g., attach/detach and location management), logical link management, and/or authentication and charging functions. In one or more embodiments, a location register of the SGSN can store location information (e.g., current cell) and user profiles (e.g., addresses used in the packet data network) of users registered with the SGSN.

In one or more embodiments, a Home Subscriber Server (HSS) can be provided that is a central database that contains user-related and subscription-related information. The functions of the HSS include functionalities such as mobility management, call and session establishment support, user authentication and access authorization. In one embodiment, the HSS can manage subscription-related information in real time, for multi-access and multi-domain offerings in an all-IP environment. The HSS can be based on Home Location Register (HLR) and Authentication Center (AuC).

In one or more embodiments, the MME can perform the function of a control-node. For example, the MME can perform functions such as idle mode tracking and paging procedure including retransmissions. The MME can also choose a serving gateway for the device 116 such as at the initial attach and at time of intra-LTE handover involving node relocation.

In one or more embodiments, a Serving Gateway (SGW) can route and forward user data packets, while also acting as the mobility anchor for the user plane during inter-eNodeB handovers and as the anchor for mobility between LTE and other 3GPP technologies (e.g., terminating S4 interface and relaying the traffic between 2G/3G systems and PGW). For idle state UEs, the SGW can terminate the downlink data path and can trigger paging when downlink data arrives for the UE. The SGW can manage and can store UE contexts, e.g. parameters of the IP bearer service, network internal routing information.

In one or more embodiments, a PDN Gateway (PGW) can provide connectivity from the device 116 to external packet data networks by being the point of exit and entry of traffic for the UE. In one or more embodiments, the device 116 can have simultaneous connectivity with more than one PGW for accessing multiple PDNs. The PGW can perform policy enforcement, packet filtering for each user, charging support, lawful interception and/or packet screening. The PGW can also act as the anchor for mobility between 3GPP and non-3GPP technologies such as WiMAX and 3GPP2 (CDMA 1× and EvDO).

Figure 2:
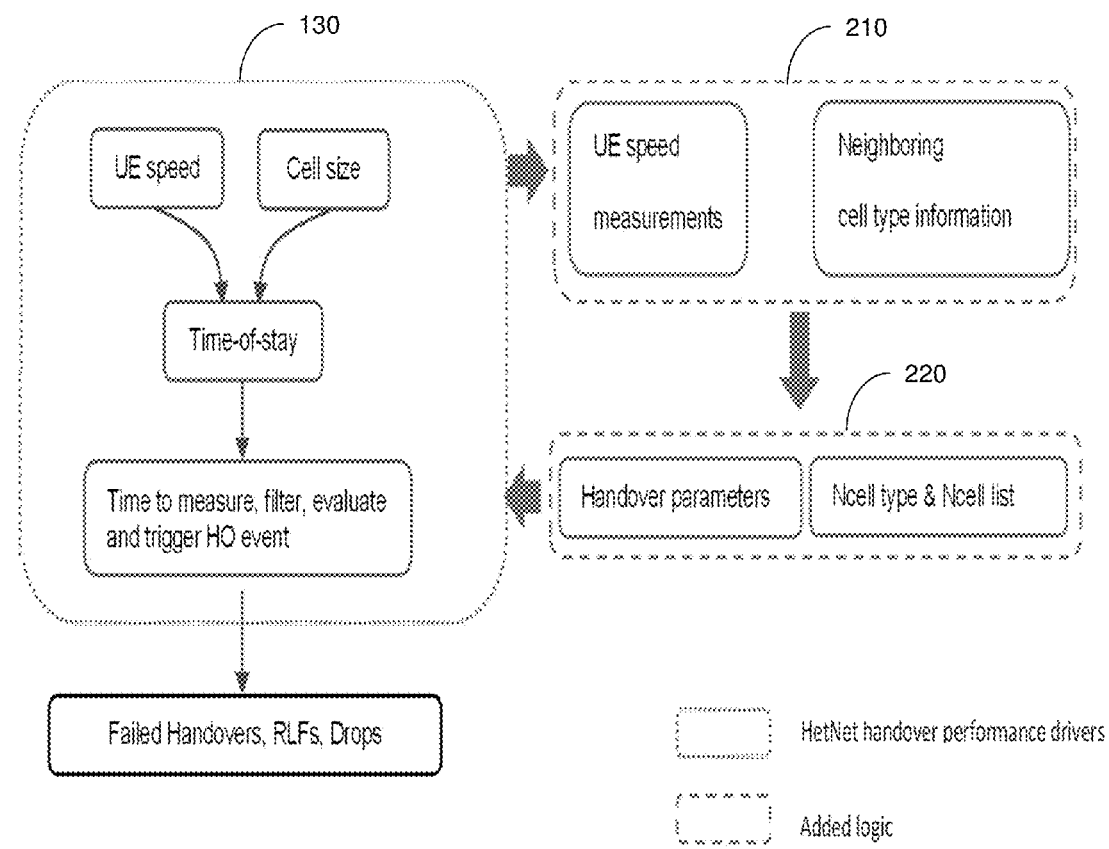
FIG. 2 depicts an illustrative embodiment of a portion of the system of FIG. 1 that can be utilized in providing the wireless communication services.

FIG. 2 depicts an illustrative embodiment of a portion of system 100 of FIG. 1 that can be utilized in providing the wireless communication services. Server 130 can compensate for the fact that the smaller the cell size the shorter the Time of Stay for faster moving UEs (e.g., vehicular) and the lesser time is available for measuring and evaluating neighboring cells. Server 130 can start the handover measurements early enough and prioritize target cells so that the probability of RLFs during handover can be reduced. At 210, the speed of each UE can be measured and the measurement result can be utilized with neighboring cell type information pointing to the appropriate set of handover parameters to be chosen for each UE's motion characteristics at 220.

Figure 3:
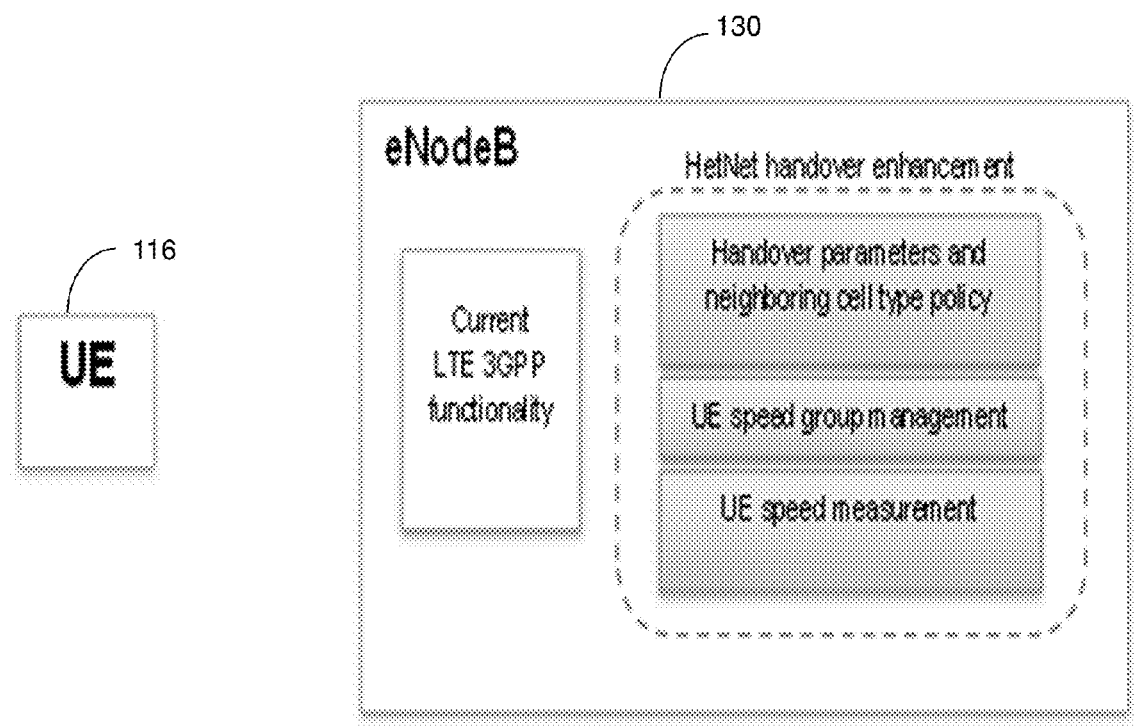
FIG. 3 depicts an illustrative embodiment of an eNodeB that can be utilized in providing wireless communication services.

FIG. 3 depicts an illustrative embodiment of an eNodeB that can be utilized in providing wireless communication services utilizing assignments to mobility speed groups. In one embodiment, different functions can be implemented at the server 130. For example, a UE speed measurement function can measure the speed and acceleration for each UE falling into certain measurement criteria. A UE speed group management function can monitor the mobility state for each UE and can assign each UE to a speed group based on speed and acceleration measurements. A handover parameters and neighboring cell types policy function can select the appropriate parameter values for each UE and initiate an RRC Connection Reconfiguration towards the UE. All three functional entities may reside at an eNodeB, in a different network element, such as a separate HW/SW entity, or in both in a distributed environment (e.g., measurement functions residing at the eNodeB while policy functions reside at the HW/SW entity). In one embodiment, there is no additional functionality required at the UE to perform the handover based on assignment to mobility speed group.

In one or more embodiments, the server 130 can utilize an analysis of the Doppler effect to estimate or otherwise determined the speed and/or acceleration of the UE. Various methods of measuring the Doppler frequency (e.g., at eNodeB) can be performed while the UE is in the RRC CONNECTED mode. For example, the frequency offset can be estimated based on the phase differences of reference symbols (or pilot symbols) received at the eNodeB. From the measured Doppler frequency offset, $f_d$, the relative speed between the transmitter and the receiver, hence the UE speed, can be estimated by the formula:

$$f_d = f * v/c, \qquad (1)$$

where f is the carrier frequency, v is the relative speed between the UE and the eNodeB and c is the speed of electromagnetic waves. Other methods of measuring the UE speed and/or acceleration can include measuring the fast fading change while the UE is in the RRC_CONNECTED mode.

Figure 4:
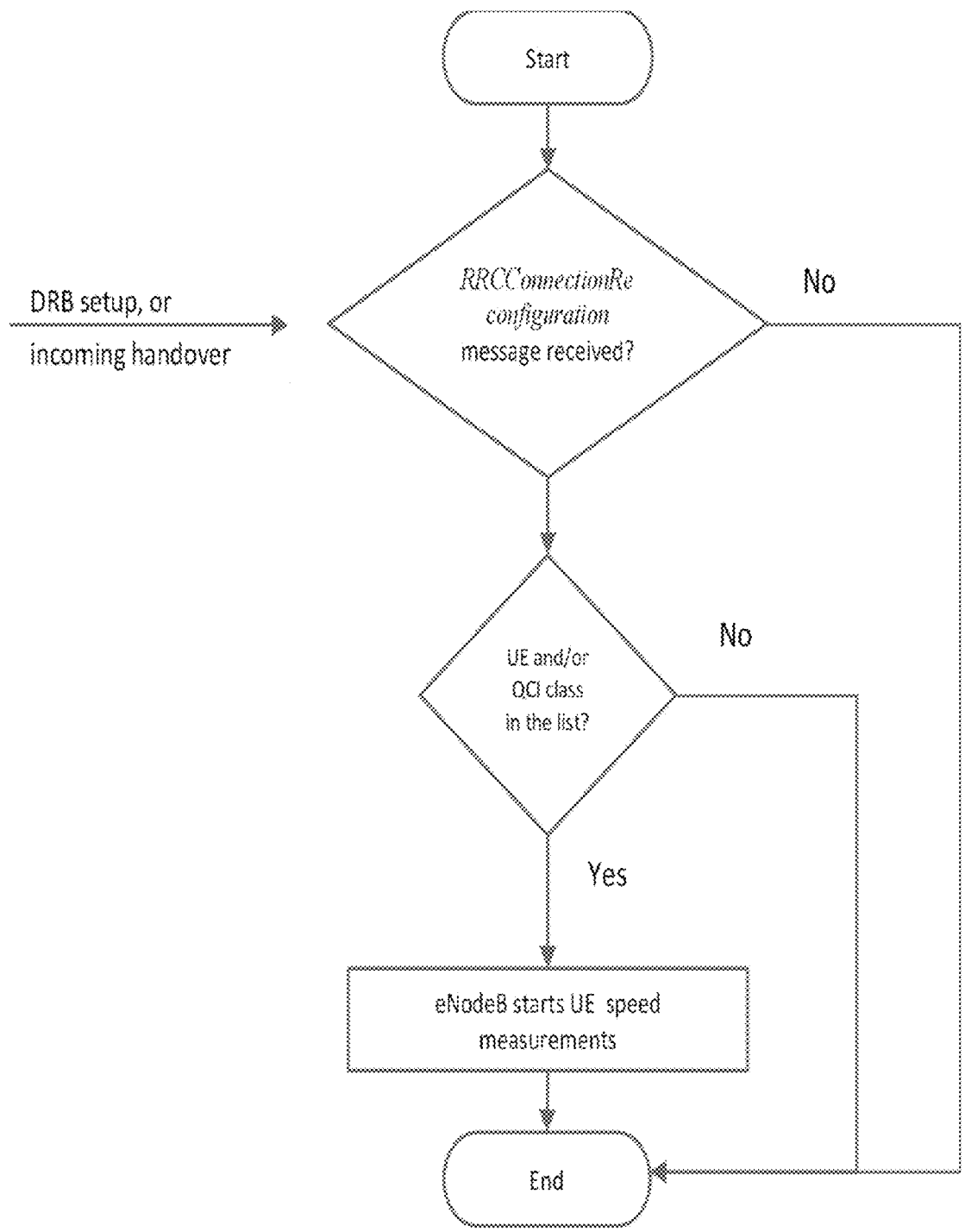
FIG. 4 depicts an illustrative embodiment of a method for triggering speed and acceleration measurements for an end user device.

In one or more embodiments, UE speed measurements can be configured to be always on or triggered by certain monitored events. In one embodiment, a continuous mode 400 is illustrated in FIG. 4, the server 130 can measure (e.g., continuously, periodically and/or based on a schedule) the speed of selected UEs in RRC_CONNECTED mode. When a transition from RRC_IDLE to RRC_CONNECTED mode, or a successful incoming handover, occurs, then the server 130 can check the number of UEs currently monitored and the QCI class of the connection. As long as both are within limits or thresholds (e.g., pre-determined or dynamic thresholds based on a number of factors such as network conditions, historical data, time of day, and so forth), the server 130 can start measuring the UE speed, such as described above utilizing an analysis of the Doppler frequency.

In one or more embodiments, an event triggered mode may be utilized for controlling whether or not speed and acceleration measurements are being performed for the UE's. Certain events in the network, such as at the serving cell and/or at the neighboring cell(s), may initiate the start of UE speed measurements at server 130 (e.g., the serving eNodeB). For example, these triggering events can be related to RF coverage, RF quality and/or high level performance monitoring functions within the radio network (e.g., Self-Optimizing Networks function also known as SON).

Figure 5:
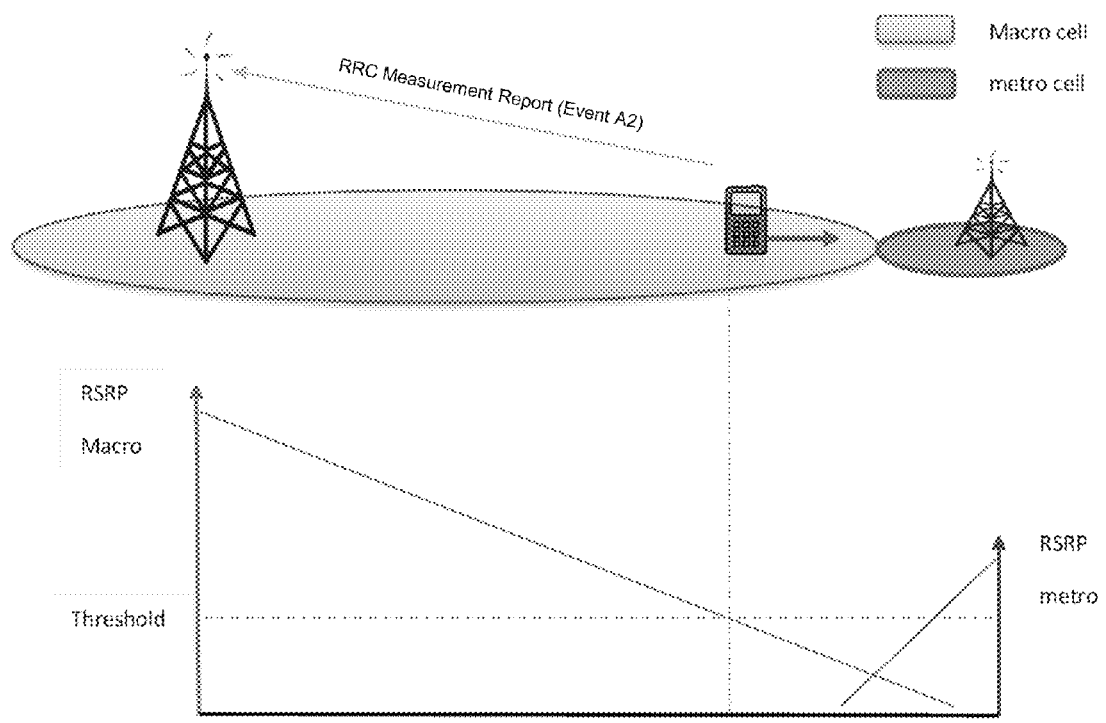
FIGS. 5-6 depict illustrative embodiments of systems for triggering speed and acceleration measurements for an end user device.

In one embodiment in FIG. 5, for those UEs in RRC CONNECTED mode, speed measurements by server 130 may start when the average path loss at the serving cell exceeds a predefined threshold, which can indicate that the UE is moving close to the edge of serving cell coverage area. In one or more embodiments, the path loss event can be triggered either in uplink (e.g., at the eNodeB) or in downlink at the UE and then forwarded to the UE Speed Measurement (UESM) function (e.g., residing at the serving eNodeB).

System 500 can implement the exemplary speed measurement techniques in combination with RRC protocol event triggers described in 3GPP TS 36.331, the disclosure of which is hereby incorporated by reference. In this example, a small cell has been deployed as a coverage solution extending the macro cellular network service area and the UE can make use of the Event A2 (Serving cell becomes worse than threshold):

$$RSRP_{Serving}|<Thresh|_{dB}$$

where $RSRP_{Serving}$ is the signal strength of the pilot sequence received from the serving Cell A and Thresh is a threshold value, such as configured by the operator or service provider or SON function. At the serving base station, the difference between the transmitted power of the pilot sequence and the UE received signal strength value (for the pilot sequence) can be calculated. When this value exceeds a certain threshold then a speed measurement event is triggered towards the UE speed measurement function (e.g., residing at the eNodeB).

Figure 6:
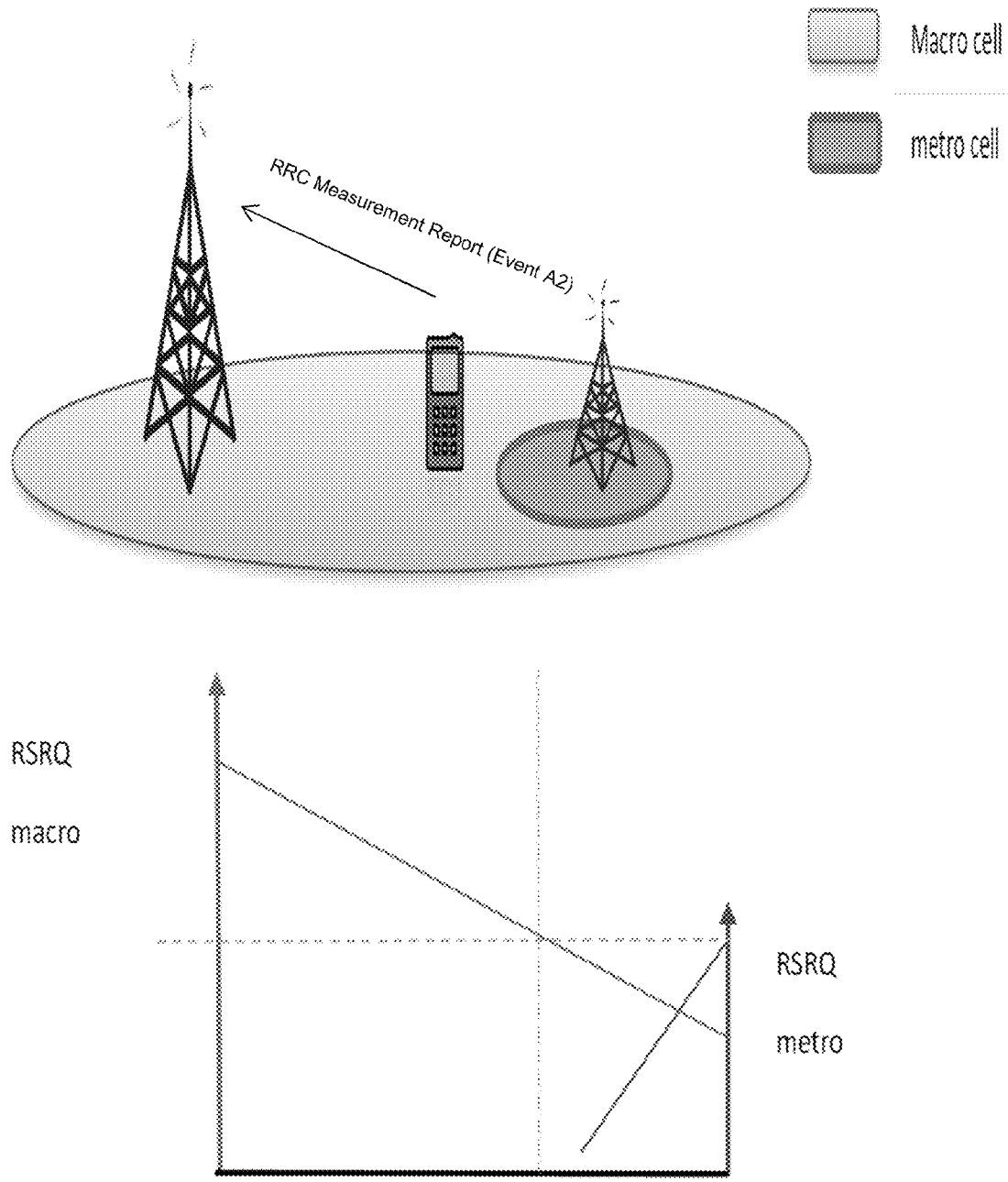

In one embodiment in FIG. 6, for those UEs in RRC CONNECTED mode, speed measurements by server 130 may start when the signal quality of the serving cell becomes worse than a predefined threshold, which can indicate that a UE is moving close to the edge of serving cell coverage area. The signal quality event can be triggered either in uplink (e.g., at the eNodeB) or in downlink at the UE and then forwarded to the UESM function (e.g., residing at the serving eNodeB).

System 600 can implement the exemplary speed measurement techniques in combination with RRC protocol event triggers described in 3GPP TS 36.331. In this example, a small cell has been deployed as a capacity solution, enhancing macro cellular network capacity at the specific location, and the UE can make use of the Event A2 (serving cell becomes worse than threshold):

$$RSRQ_{Serving}|_{dB}<Thresh|_{dB}$$

where $RSRQ_{Serving}$ is the signal quality of the pilot sequence received from the serving Cell A and Thresh is a threshold value configured by the operator or SON function. At the serving base station, upon reception of RRC Event A2, a speed measurement event can be triggered towards the UE speed measurement function (e.g., residing at the eNodeB).

In one or more embodiments, for those UEs in RRC CONNECTED mode, speed measurements by the server 130 may start when the load at the serving cell becomes higher than a threshold (such as a pre-defined threshold or a dynamic threshold that is adjusted based on one or more factors, such as network conditions, historical data and so forth). The load event can be triggered either for uplink or downlink air interface load, or backhaul load (e.g., at the eNodeB) and then forwarded to the UESM function to start UE speed measurements.

RLFs during handovers can be reported by UEs upon request from the network using the 3GPP RRC protocol UEInformationRequest procedure. A SON function (e.g., centralized or local at the neighboring eNodeB) can evaluate and decide if handover related RLFs are due to the fact that UE speed is below or exceeds a threshold. In this example, the UE speed event can be detected at a target cell and can be traced back to the serving cell. As a result, the serving cell can initiate UE speed measurements for each UE in an RRC_CONNECTED mode and can apply speed specific handover configuration for each UE.

Figure 7:
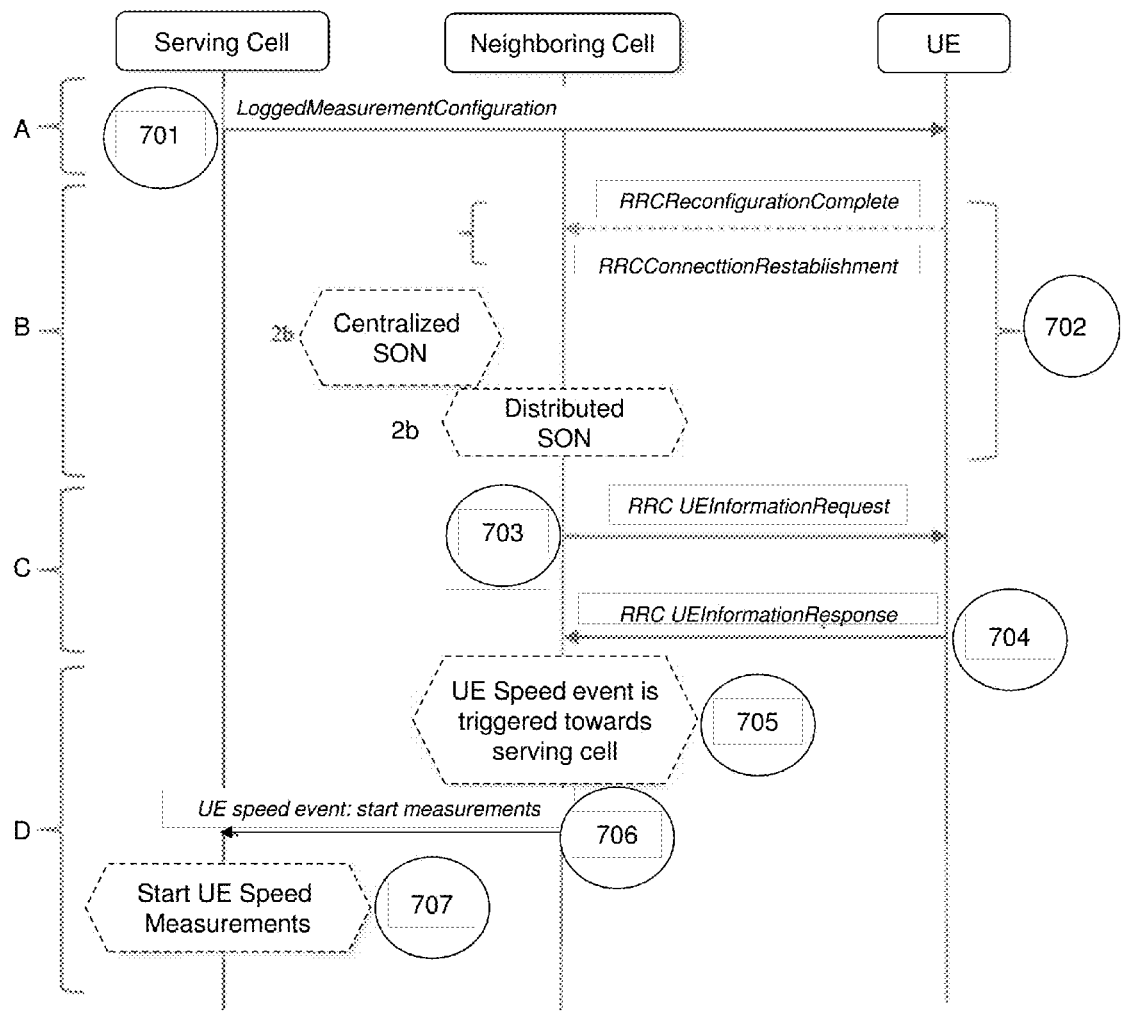
FIGS. 7-8 depict illustrative embodiments of flow charts for triggering speed and acceleration measurements for an end user device.

Referring to FIG. 7, flow chart 700 illustrates the procedure for the triggering event being a serving cell load. This procedure can be split into four phases: A) logging configuration; B) RLF detection by SON; C) UE measurements reporting; and D) Evaluation and decision by SON. At 701, the UE initiates logging (while at the serving cell) after receiving the RRC LoggedMeasurementConfiguration message. At 702, the neighboring cell can request the UE to provide information regarding RLF related to handover, such as upon occurrence of any of the following events: An RRCReconfigurationComplete or RRCConnectionReestablishment message sent by a UE when an incoming handover or transition from RRC_IDLE to RRC_CONNECTED occurs at the Neighboring Cell; and a SON function, i.e. central or local, detects incoming handover issue that is related to UE speed. UE speed related issues can be identified by, but not limited to: a high number of X2 or S1 incoming handover preparation and/or execution attempts from a neighboring cell and a relatively small number of RRCReconfigurationComplete messages (indicating successful handover) from that particular cell.

At 703, the eNodeB can send an RRC UEInformationRequest message to the UE with rlf-ReportReq-r9 indicator set to true. At 704, the UE can send a UEInformationResponse message which contains rlf-Report-r10 including the following Information Elements (IEs): LocationInfo-r10 (locationCoordinates; horizontal Velocity; and bearing and horizontalSpeed); measResultLastServCell-r9: SEQUENCE {rsrpResult-r9, rsrqResult-r9}; failedPCellId-r10 CHOICE {cellGlobalId-r10, or (physCellId-r10, carrierFreq-r10)}; and connectionFailureType-r10=hof. At 705, the UE-reported RFLs due to handover are evaluated by a distributed SON entity at target eNodeB or by a centralized/hybrid SON entity. A Mobility Robustness Optimization (MRO) speed event can be triggered at eNodeB or centralized/hybrid SON when the number of RLFs due to handover failures for a specific ECGI or (PCI, ARFCN) has exceeded a threshold and the speed reported by those UEs falls in the medium or the high speed range.

At 706, the neighboring cell (where the RLF was reported) can initiate a UE speed event request towards the serving cell (where the high RLFs due to HO occurred) via X2 interface if cells belong to different eNodeBs. In the case where both Serving and Neighboring Cells belong to the same eNodeB the UE speed event can be forwarded over an eNodeB internal interface. At 707, the serving cell upon reception of the UE speed event can start UE speed measurements. LTE positioning protocol can allow for speed and bearing measurements and for the location and horizontal speed information to be sent to the eNodeB as part of the MRO related info. In one or more exemplary embodiments of flow chart 700, the cells can reside in the same or different eNodeBs.

In one or more embodiments, a local SON function at the serving cell (or a centralized SON function at a network node connected to the serving cell) may detect performance degradation based on various performance factors or criteria, such as session/call retainability, handover performance, throughput, and/or latency, and consequently can trigger a UE speed measurement event at the serving cell for each serving UE in RRC_CONNECTED mode.

Figure 8:
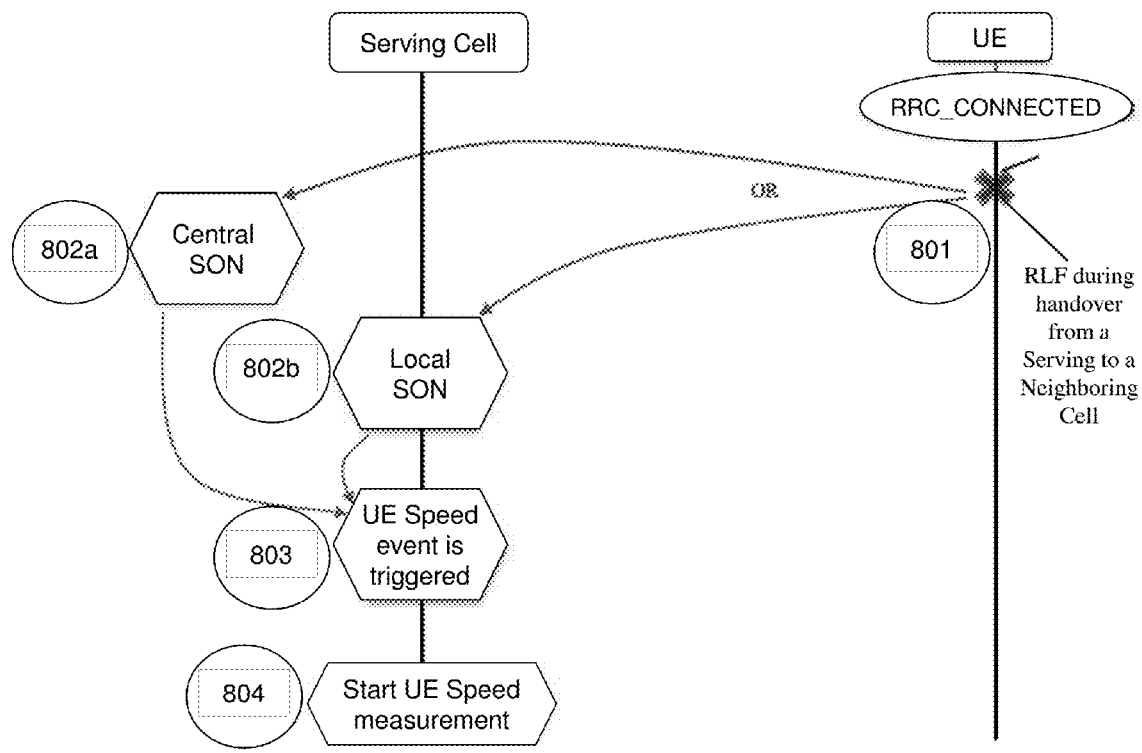

Method 800 of FIG. 8 illustrates this procedure. At 801, handover failures that result into RLF events are captured or otherwise identified by either or both of a local or a central SON function that monitors the retainability performance at the serving cell. At 802a and/or 802b, the SON can detect that RLFs (due to handover) exceed a threshold. In one embodiment, the SON can identify that the UE speed is the root cause. For example, drops due to handovers can be detected based on, but not limited to, at the serving sell a number of RLFs due to outgoing handover failures exceeds a certain threshold and the ratio defined by the number of handover attempts over the number of new calls/sessions exceeds a certain threshold indicating pass through traffic. The SON function can reside in either or both of the OSS or eNodeB, such as a central SON function in the OSS or a local SON function in the eNodeB. At 803 and 804, the eNodeB can start the UE speed measurements based on the triggering event. One or more of the steps described in FIG. 4 can be employed following step 804. In one or more exemplary embodiments, cells can reside in the same or different eNodeBs.

Figure 9:
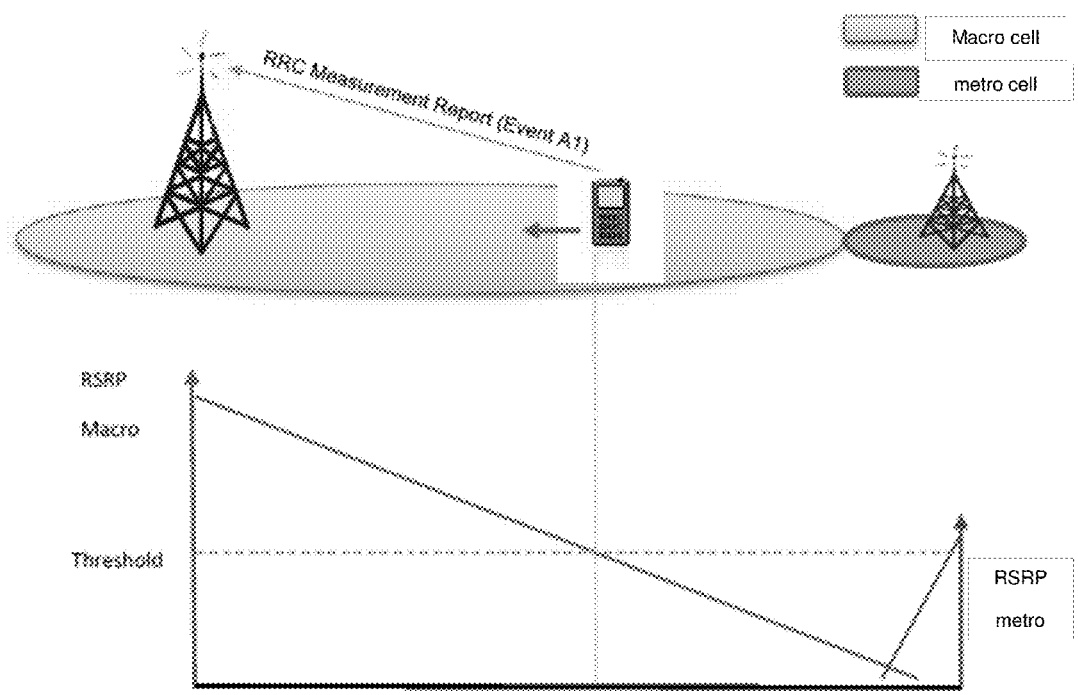
FIGS. 9-10 depict illustrative embodiments of systems for triggering stopping speed and acceleration measurements for an end user device.
Figure 10:
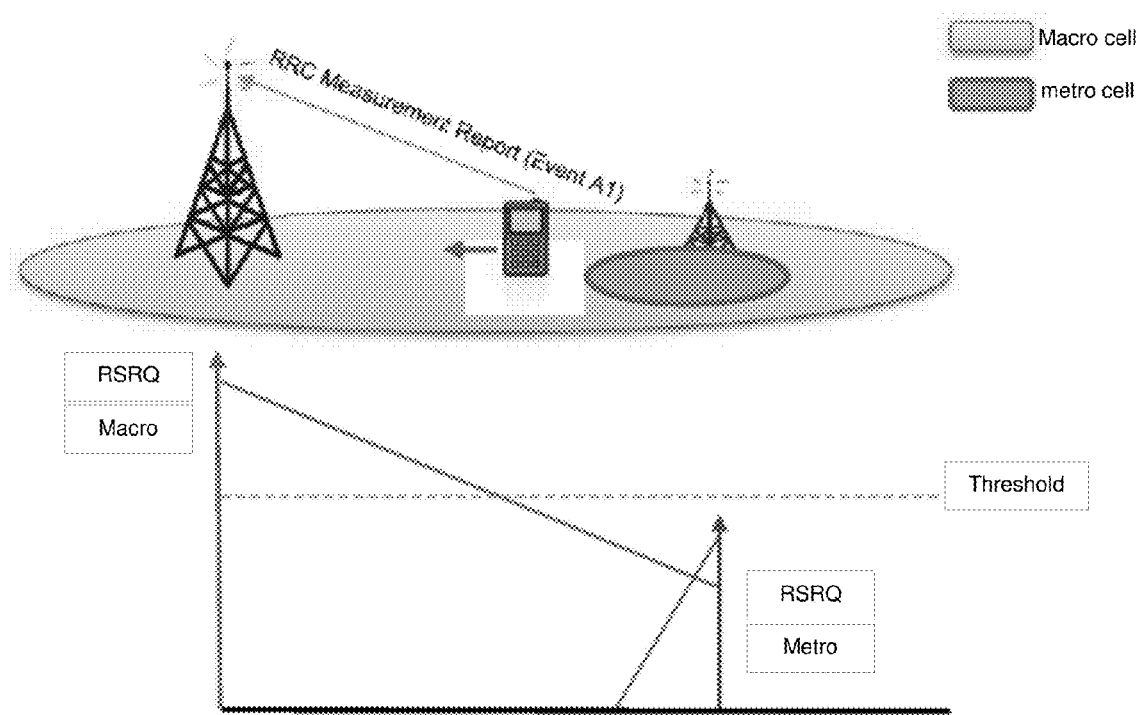

FIGS. 9-10 depict illustrative embodiments of systems for triggering stopping speed and acceleration measurements for an end user device.

When the average path loss at the serving cell becomes smaller than a predefined threshold, indicating that a UE is moving closer to the antenna of the serving cell, speed measurements may be suspended or otherwise stopped at the serving cell, as in system 900. In this example the UE can make use of the reporting of the Event A1 (serving becomes better than threshold).

$$RSRP_{Serving}|_{dB} > Thresh|_{dB}$$

where $RSRP_{Serving}$ is the signal strength of the pilot sequence received from the serving Cell A and Thresh is a threshold value configured by the operator.

When the signal quality at the serving cell becomes better than a predefined threshold, indicating that a UE is moving closer to the antenna of the serving cell, speed measurements may be suspended or otherwise stopped at the serving cell, as in system 1000.

In one or more embodiments, for those UEs in RRC CONNECTED mode, speed measurements may stop when the load at the serving cell becomes lower than a predefined threshold. The load event can be triggered either for uplink or downlink air interface load, or backhaul load at the eNodeB and then forwarded to the UESM function to stop the UE speed measurements.

Figure 11:
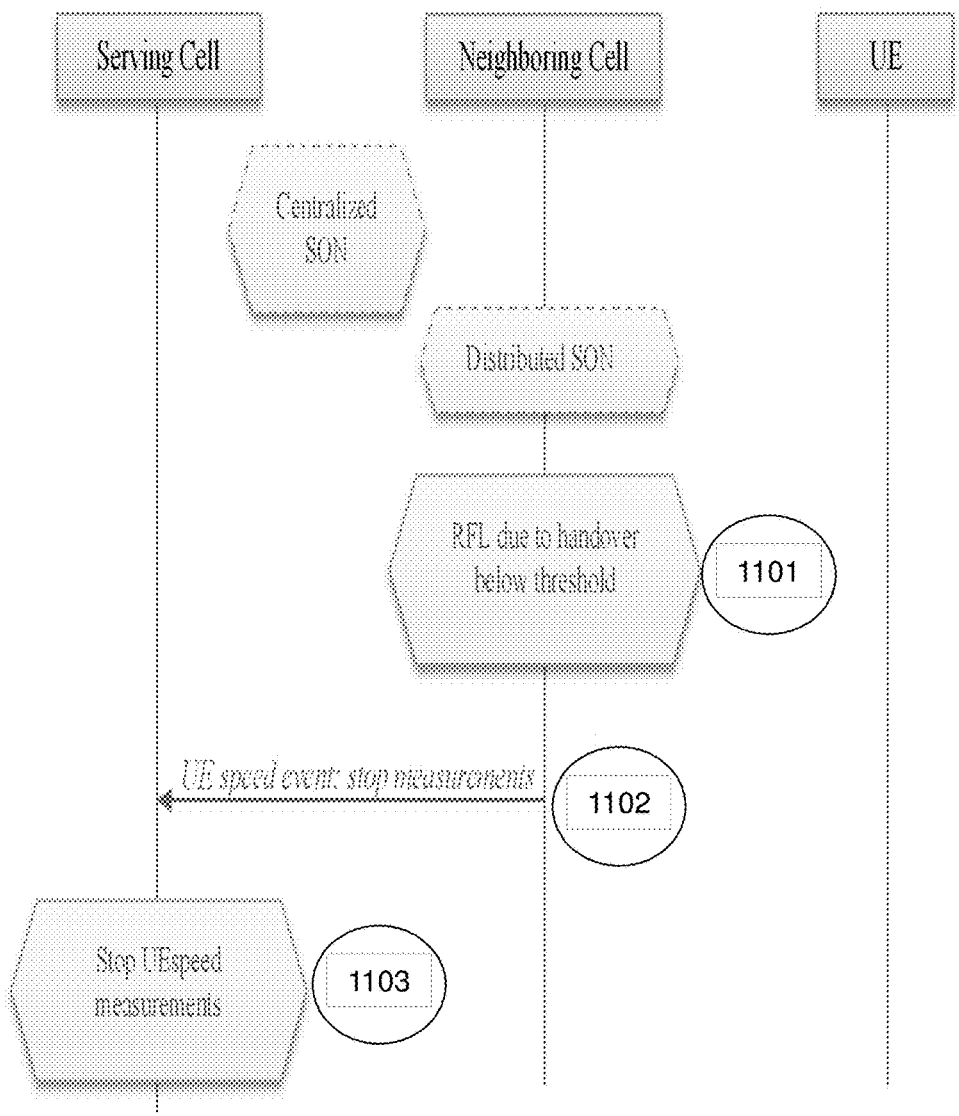
FIG. 11 depicts an illustrative embodiment of a flow chart for triggering stopping speed and acceleration measurements for an end user device.

In one or more embodiments, a neighboring cell SON entity can detect RLFs (due to handover) being below a threshold. For example, a SON function (i.e., centralized and/or local at the neighboring eNodeB) may evaluate and decide that handover related RLFs are below a threshold or not related to UE speed. In such a case, the UE speed measurements may be suspended at the serving cell. This procedure is illustrated in flow chart 1100 of FIG. 11. At 1101, a local SON function at the serving cell (and/or a centralized SON function in a network node that is connected to the serving cell) may evaluate and decide that handover related RLFs are below a threshold and/or not related to UE speed. At 1102, the SON can initiate a UE speed event to stop the UE speed measurements for all UEs in RRC_CONNECTED mode which occurs at 1103.

In one or more embodiments, potential UE speed measurement errors may lead to inappropriate adaptation of handover parameters which would impact handover performance by generating unnecessary or improper handover events. In one or more embodiments, in addition to speed measurements, acceleration measurements can also be used to classify a UE into a certain speed group from among a plurality of speed groups. In this example, both speed and acceleration measurements are forwarded to the speed group management function where the speed classification takes place. In one embodiment, two or more speed measurements are utilized to calculate the UE acceleration.

After the first set of speed and acceleration measurements has been processed (e.g., at the eNodeB), a UE gets assigned to a speed group. Any number and configuration of speed groups can be used in the exemplary embodiments, such as a pedestrian speed group, a vehicular low speed group, a vehicular medium speed group, and a vehicular high speed group. In one embodiment, a certain number of speed measurement samples can be required to fall within the boundaries of a speed group and acceleration should be within a certain region.

In one or more embodiments, as the UE changes its speed over time, a speed group change may be triggered. Both UE speed and acceleration can be used as criteria for a transition from one speed measurement group to another. In one embodiment, if the speed measurement result exceeds the currently assigned speed group upper boundary and a monotonous increase of speed has been detected within a time interval (e.g., a positive acceleration), then a transition to a higher speed group can occur. If the speed measured exceeds the currently assigned speed group upper boundary but the speed does not show a monotonous increase within a time interval (e.g., a positive acceleration), then a transition to a higher speed group may not occur. If the speed measurement result is below the currently assigned speed group lower boundary and a monotonous decrease of speed has been detected within a time interval, (e.g., a negative acceleration) then a transition to a lower speed group may occur. If the speed measured is below the currently assigned speed group lower boundary and the speed did not show monotonous decrease within a time interval (e.g., a negative acceleration), then a transition to a lower speed group may not occur. In one or more embodiments, in order to avoid a UE oscillating between speed groups (e.g., a red light environment), a time delay can be applied for a UE that exceeds a certain number of speed group transitions within a predefined time interval.

Figure 12:
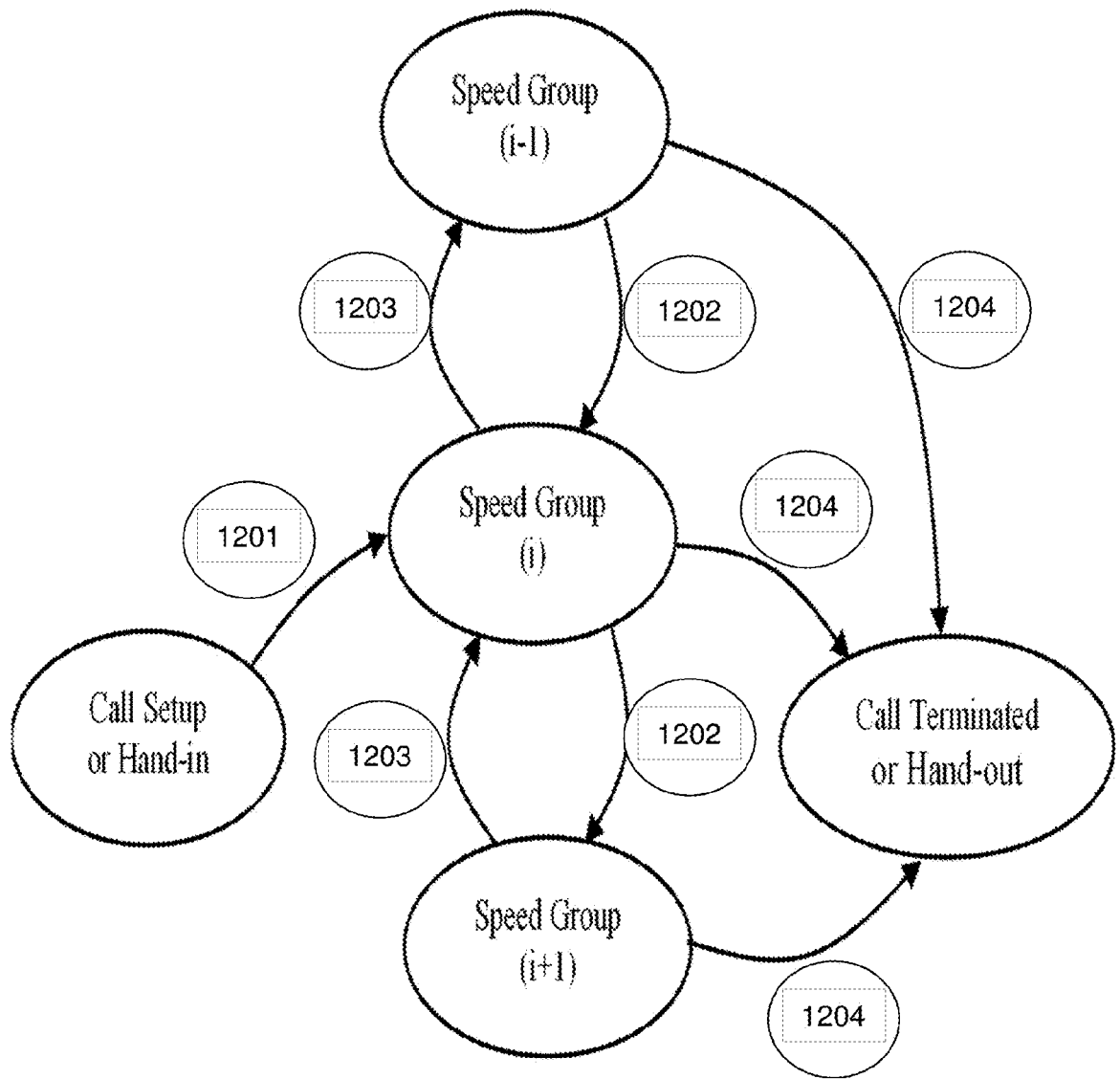
FIG. 12 depicts an illustrative embodiment of a flow chart for transitioning between mobility speed groups.
Figure 16:
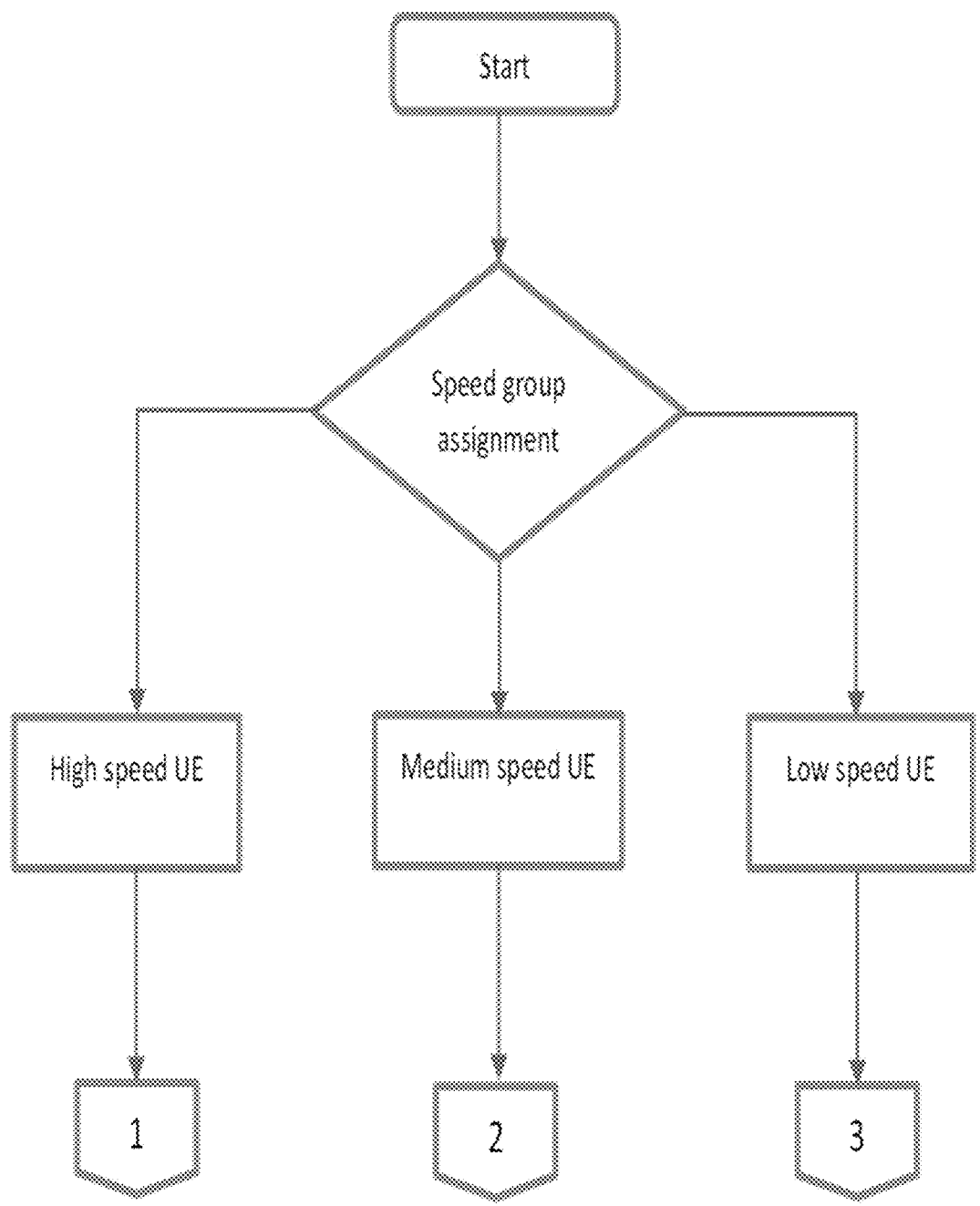
FIGS. 16-20 depict illustrative embodiments of methods for managing handovers in a wireless network.
Figure 17:
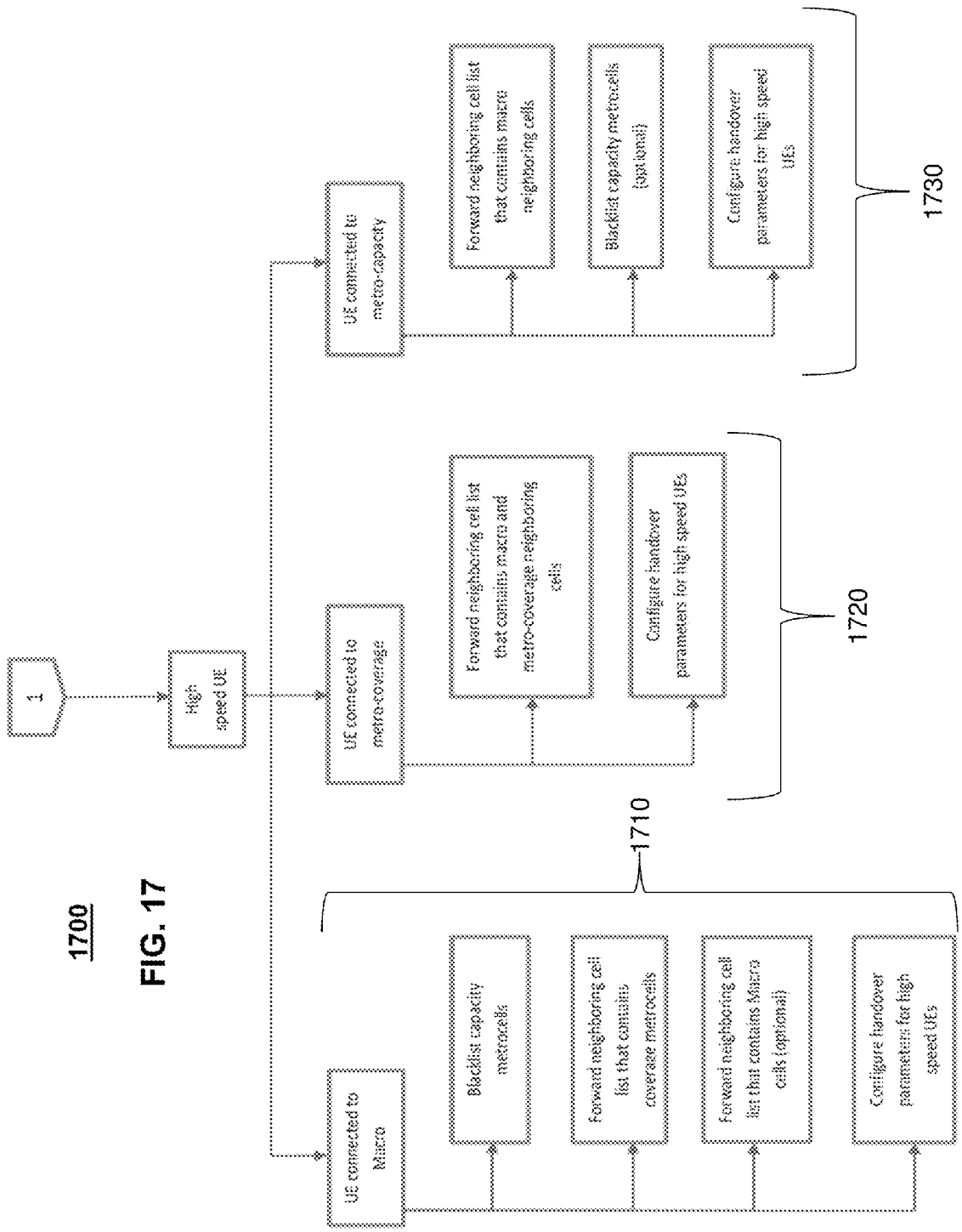
Figure 18:
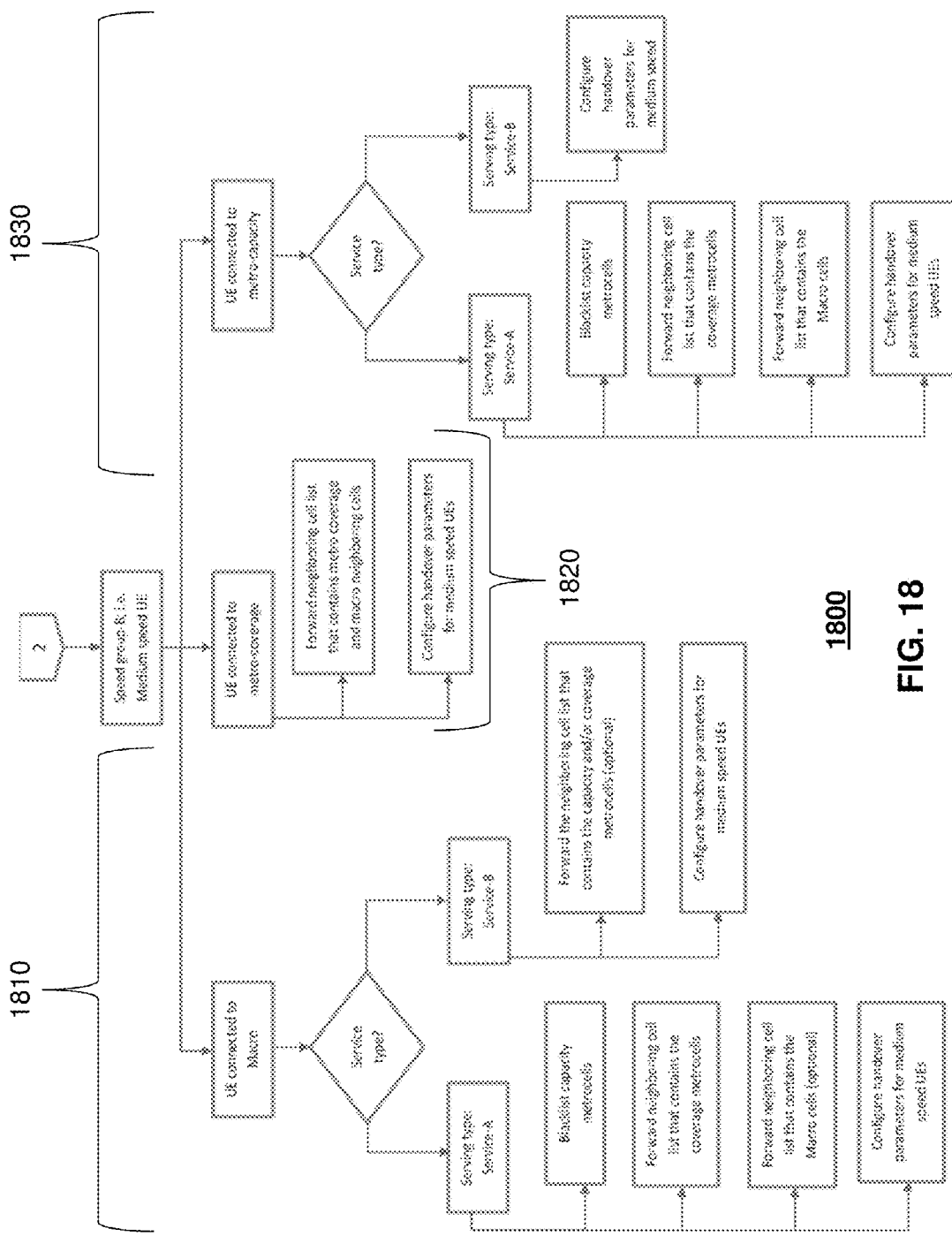
Figure 19:
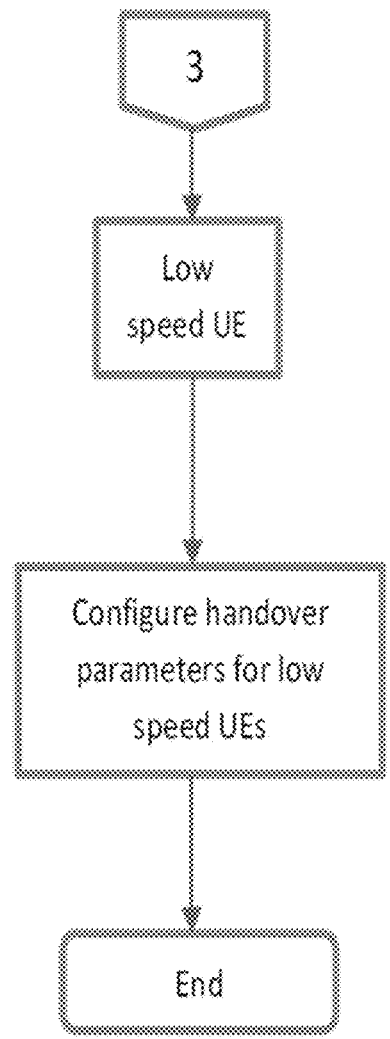

FIG. 12 depicts an illustrative embodiment of a flow chart 1200 for an exemplary speed group classification procedure.

At 1201, UE speed and acceleration measurements can start. This can include an initial UE speed group selection. At 1202, there can be a transition from a lower to a higher speed group. At 1203, there can be a transition from a higher to a lower speed group. At 1204, the UE speed measurements can stop.

In one or more embodiments, a macrocell is a cell that provides radio coverage in a wide geographical area, from few hundred meters to few kilometres, while a small cell is a cell that provides radio coverage in a small geographical area, such as less than 500 m. Small cells can be deployed either outdoors or indoors as "Coverage" and "Capacity" solutions to macro radio network problems. Table 1300 of FIG. 13 illustrates different deployment scenarios for small cells.

Different small cells deployment can utilize or otherwise require different handover configuration profiles, e.g., a capacity outdoor small cell may not be expected to serve high speed UEs crossing its coverage footprint, while a coverage outdoor small cell may be expected to serve medium to high speed UEs in the absence of macro radio coverage. In one or more embodiments, the network (e.g., the eNodeB) can be able to distinguish between these two types. In one embodiment, in order to distinguish between Coverage and Capacity types of small cells, two dedicated pools of Physical Cell Identifiers (PCIs) for small cells, (one for Coverage and one Capacity) can be configured at the eNodeB, as illustrated in table 1400 of FIG. 14, where j, k, l and m∈[1, 502].

In one or more embodiments, neighboring small cell list can be forwarded. For fast moving UEs, the time the UEs spend to identify and measure neighboring cells may be significant or critical to their handover performance. In order to speed up PCI decoding and consequently L1 measurements for small cells, the serving eNodeB can send the neighboring list of small cells to its UEs via the RRC protocol RRCReconfiguration message using the information element (IE) cellsToAddModList The RRCReconfiguration can be used to signal the transition from RRC IDLE to RRC CONNECTED, or successful incoming handover. A number of different technique can be used for forwarding this data. In one embodiment, the eNodeB can send the small cells neighboring list to all UEs prior to the UE speed measurements starting. In another embodiment, the eNodeB can send the small cells neighboring list together with UE speed specific handover parameters only for those UEs moving above a threshold speed such as a defined medium or high speed. In one embodiment, the list of neighboring small cells can reside in the eNodeB and/or in a different node within the network.

In one embodiment, desired values of handover related parameters can depend on the speed of the UE. For example, a parameter specifying the type of averaging, such as a filter coefficient applied to Received Signal Strength (RSS) or Received Signal Quality (RSQ) measurements, can be different for a slow-moving UE as opposed to a fast-moving UE. In this example, handover parameters specific to a speed group may be assigned or otherwise provided to the UE to further reduce the time it takes for a UE to measure, evaluate and trigger the RRC mobility event to the network.

In addition to UE speed specific parameter settings, the service type, the cell type, and/or the cell size can be considered as part of the handover parameters and parameter values selection process. For example, different services can have different tolerances to handover interruption time. For instance, background services, web browsing, email, and so forth can tolerate longer handover interruption time than telephony services. In one embodiment, the handover policy can be based on the service type. In one embodiment, blacklisting of certain PCIs may be performed in order to avoid handovers to small cells for certain type of services and UE speed groups (e.g., fast-moving UEs). For example, in LTE, each service type or group of services can be mapped to a Quality of Service (QoS) Class Identifier (known as QCI) to facilitate the consideration of the service type in the handover policy.

In one or more embodiments, whether to allow high speed UEs in small cells can depend on the type of deployment (e.g. outdoor coverage vs. outdoor capacity) and can depend on at what UE speed a handover event to a small cell is beneficial from both the subscriber QoS point of view and network capacity point of view. In one embodiment, small cells can be deployed in the presence of good macro RF coverage, therefore high speed UEs may not be permitted to hand-in from macro. In one embodiment, in order to prevent handovers from macro to small cell, a high speed UE can suspend measurements for those capacity-marked-small cells, e.g., the eNodeB can communicate via dedicated signaling (to those high speed UEs) the PCIs of Capacity small cells that are blacklisted.

In one or more embodiments, it can be desirable to allow high speed UEs (e.g., greater than 50 km/h) to hand-in from macro cells. For higher speed, the RLF rate can increase as speed increases due to missed handover opportunities. One or more of the exemplary embodiments provides for faster handover triggering for those fast moving UEs which can reduce the number of RLFs. The exemplary embodiments can lessen the time required for measurement, filtering, decision, preparation and execution. A shorter L1 to L3 reporting time and a smaller K value of L3 filtering can be employed. Also, the reduction of Discontinuous Reception (DRX) cycle duration or even the suspension of DRX cycle(s) can be utilized in one or more embodiments to further reduce the time a UE spends on handover.

FIG. 15 depicts a table 1500 depicting an illustrative embodiment of parameters and their assigned values according to a speed-based policy, that are communicated the UE or UEs via dedicated signaling message or messages. Some of the handover parameters together with indicative values for each UE speed type (e.g., low, medium, high) are listed. It should be understood that these parameter values are examples and other parameter values can be used in addition to or in place of those in table 1500.

FIGS. 16-19 depict illustrative embodiments of methods for managing handovers in a wireless network based on one or more of end user device speed (and/or acceleration), cell size, cell type and/or service type. Method 1600 categorizes the speed groups into high, medium and low, however, any number of speed groups can be utilized covering any ranges of speeds. As explained above, the speed group assignments can be selected based on measured speed and acceleration of the end user device, such as via network-based Doppler frequency analysis. However, the exemplary embodiments can employ various other methodologies for determining the speed and/or acceleration of the end user device.

Method 1700 illustrates facilitating the handover process based on cell size (e.g., macrocell vs. small cell) and based on cell type (e.g., coverage vs. capacity) for a high speed group. For instance at 1710 where the high speed UE is connected with a macrocell, certain cells can be removed from handover consideration (or otherwise prevented from receiving the incoming handover), such as capacity small cells. Neighboring cell information, such as lists of coverage small cells and/or macro cells (and/or data associated with those cells) can be provided to the UE to facilitate cell selection for the handover. Handover parameters and their associated values that correspond to the high speed group can be used as part of the handover procedure, such as a filter coefficient to be applied to received signal strength measurements, a time to trigger value, a discontinuous reception state, or a combination thereof. Other exemplary handover parameters and their associated values that can be predetermined (or dynamically adjusted) for the speed groups are listed in table 1500, however, this list is not intended to be limiting and various other handover parameters can be designated to a particular mobility speed group.

At 1720 where the high speed UE is connected with a coverage small cell, neighboring cell information, such as lists of coverage small cells and/or macro cells (and/or data associated with those cells) can be provided to the UE to facilitate cell selection for the handover. Handover parameters that correspond to the high speed group can be used as part of the handover procedure.

At 1730 where the high speed UE is connected with a capacity small cell, neighboring cell information, such as lists of macro cells (and/or data associated with those cells) can be provided to the UE to facilitate cell selection for the handover. Certain cells can be removed from handover consideration (or otherwise prevented from receiving the incoming handover), such as capacity small cells. Handover parameters that correspond to the high speed group can be used as part of the handover procedure.

Method 1800 illustrates facilitating the handover process based on cell size (e.g., macrocell vs. small cell) and based on cell type (e.g., coverage vs. capacity) for a medium speed group. For instance at 1810 where the medium speed UE is connected with a macrocell, a service type (e.g., voice session vs. email, and so forth) can be determined and the handover policy can change based on the type of service. In one embodiment, certain cells can be removed from handover consideration (or otherwise prevented from receiving the incoming handover), such as capacity small cells (depending on the service type). In another embodiment, neighboring cell information, such as lists of coverage small cells, capacity small cells and/or macro cells (and/or data associated with those cells) can be provided to the UE to facilitate cell selection for the handover, where the blacklisted cell size and/or type is based on the service type. Handover parameters and their associated values that correspond to the medium speed group can be used as part of the handover procedure, such as a filter coefficient value to be applied to received signal strength measurements, a time to trigger value, a discontinuous reception state, or a combination thereof.

At 1820 where the medium speed UE is connected with a coverage small cell, neighboring cell information, such as lists of coverage small cells and/or macro cells (and/or data associated with those cells) can be provided to the UE to facilitate cell selection for the handover. Handover parameters that correspond to the medium speed group can be used as part of the handover procedure.

At 1830 where the medium speed UE is connected with a capacity small cell, a service type (e.g., voice session vs. email, and so forth) can be determined and the handover policy can change based on the type of service. In one embodiment, certain cells can be removed from handover consideration (or otherwise prevented from receiving the incoming handover), such as capacity small cells (depending on the service type). In another embodiment, neighboring cell information, such as lists of coverage small cells and/or macro cells (and/or data associated with those cells) can be provided to the UE to facilitate cell selection for the handover, where the blacklisted cell size and/or type is based on the service type. Handover parameters and their associated values that correspond to the medium speed group can be used as part of the handover procedure.

Method 1900 illustrates facilitating the handover process for a low speed group. Handover parameters and their associated values that correspond to the slow speed group can be used as part of the handover procedure. In one embodiment, the handover procedure for the slow speed group may not be dependent on cell size (e.g., macro cell vs. small cell) nor dependent on cell type (e.g., coverage vs. capacity).

Figure 20:
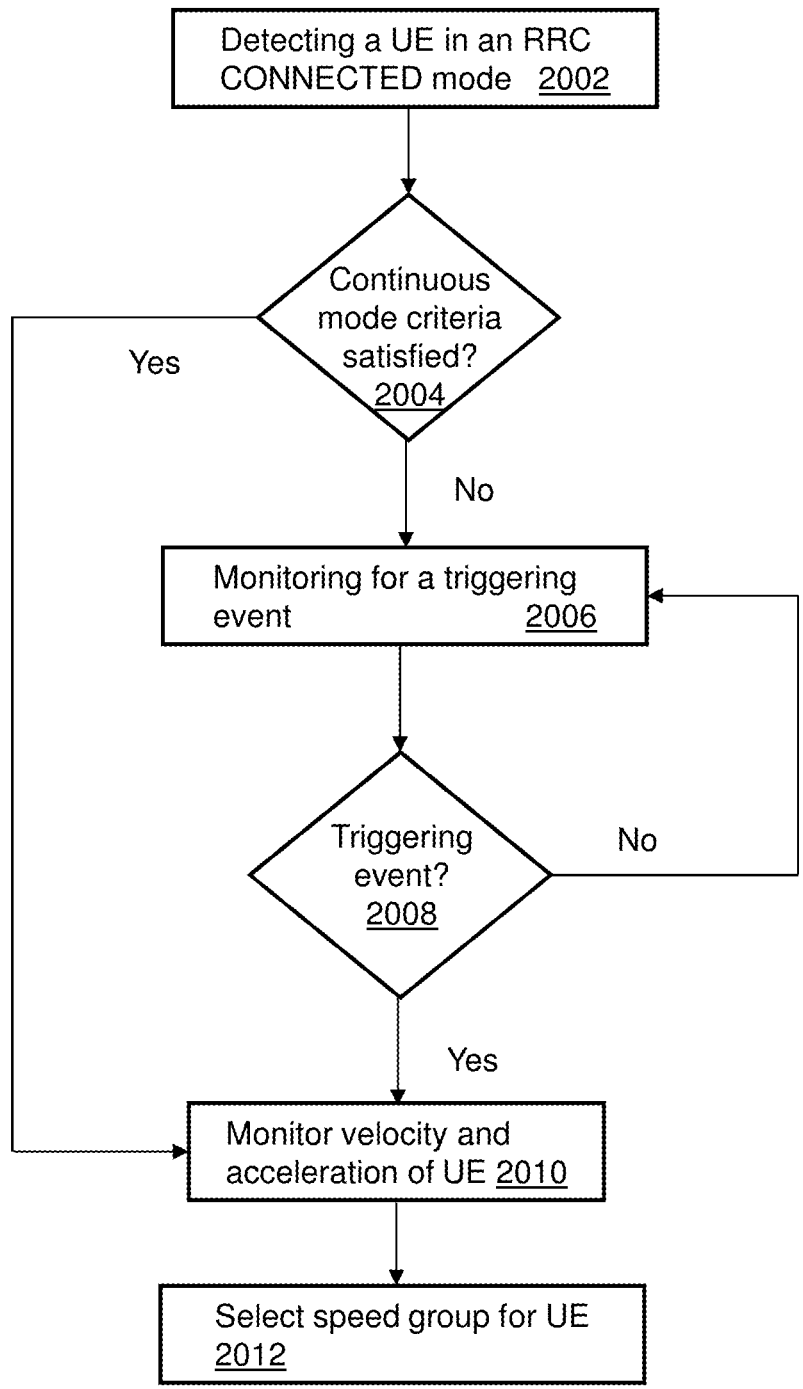

FIG. 20 depicts an exemplary method 2000 for assigning an end user device to a mobility speed group to facilitate handovers in a wireless network. Method 2000 can be performed by various devices or combinations of various devices, including the eNodeB. At 2002, a mobile communication device (e.g., device 116 of FIG. 1) having a radio resource control connection with a wireless network can be detected. At 2004, a determination can be made as to whether speed/acceleration monitoring is to be performed based on a continuous mode or based on a triggering event mode. If the triggering event mode is to be utilized then method 2000 proceeds to step 2006, otherwise method 2000 proceeds to step 2010 when the continuous mode criteria have been satisfied (e.g., designated device and/or designated QCI class for the device). In one embodiment, Various factors can be considered as to whether a continuous mode or triggering event mode should be utilized for a UE, such as one or more of network load, type of UE, type of communication session, historical data (e.g., number of RLF's due to handovers), and so forth.

At 2006 when the mobile communication device is in a triggering event mode, monitoring for a first triggering event associated with the device can be performed. The first triggering event can be of various types, including being associated with or otherwise determined from average path loss measurements at the serving cell, signal quality measurements at the serving cell, load measurements at the serving cell, a measurement of radio link failures for incoming handovers at a neighboring cell, a measurement of session retainability at the serving cell, a measurement of handover performance at the serving cell, a measurement of throughput at the serving cell, a measurement of latency at the serving cell, or a combination thereof.

At 2008, a determination can be made as to whether a triggering event has occurred. If the triggering event has occurred then method 2000 proceeds to step 2010 otherwise the method continues monitoring for the triggering event. At 2010, monitoring can be performed to determine a speed and/or an acceleration of the mobile communication device in a serving cell of the wireless network. At 2012, a first mobility speed group can be selected from among a plurality of mobility speed groups based on the speed and/or the acceleration of the mobile communication device. In this example, handover parameters can be assigned to each speed group of the plurality of mobility speed groups. The handover parameters can facilitate a handover by the wireless network from the serving cell to a target cell. One or more of the handover parameters can be static values that do not change or can be dynamic values that change based on various factors such as network conditions.

In one embodiment, the monitoring of the speed and the acceleration of the mobile communication device can be based on a Doppler frequency associated with the radio resource control connection between the mobile communication device and the wireless network. In another embodiment, the first triggering event occurs prior to a first handover for the radio resource control connection between the mobile communication device and the wireless network that establishes a communication session for the mobile communication device. In one embodiment, method 2000 can also include detecting a change in the speed, the acceleration or a combination thereof; and selecting a second mobility speed group from among the plurality of mobility speed groups based on the change. In one embodiment, the method 2000 can include monitoring for a second triggering event associated with the mobile communication device; and responsive to the second triggering event, ceasing the monitoring of the speed and the acceleration of the mobile communication device. In this example, the monitoring for the second triggering event can be based on average path loss measurements, signal quality measurements, cell load measurements, a measurement of radio link failures for incoming handovers, or a combination thereof. In one embodiment, a threshold number of measurements of the speed and the acceleration of the mobile communication device are performed prior to selecting the first mobility speed group. In one embodiment, method 2000 can include detecting a change in the speed, the acceleration or a combination thereof; identifying a last change of speed group for the mobile communication device; determining a time period associated with the last change; and selecting a second mobility speed group from among the plurality of mobility speed groups based on the change and responsive to the time period satisfying a minimum threshold time between speed group changes. In one embodiment, the monitoring of the speed and the acceleration of the mobile communication device can be based on determining a Doppler frequency offset according to phase differences of reference symbols received by the system. In one embodiment, the monitoring of the speed and the acceleration of the mobile communication device can be based on measuring a fast fading change associated with the radio resource control connection between the mobile communication device and the wireless network.

Figure 21:
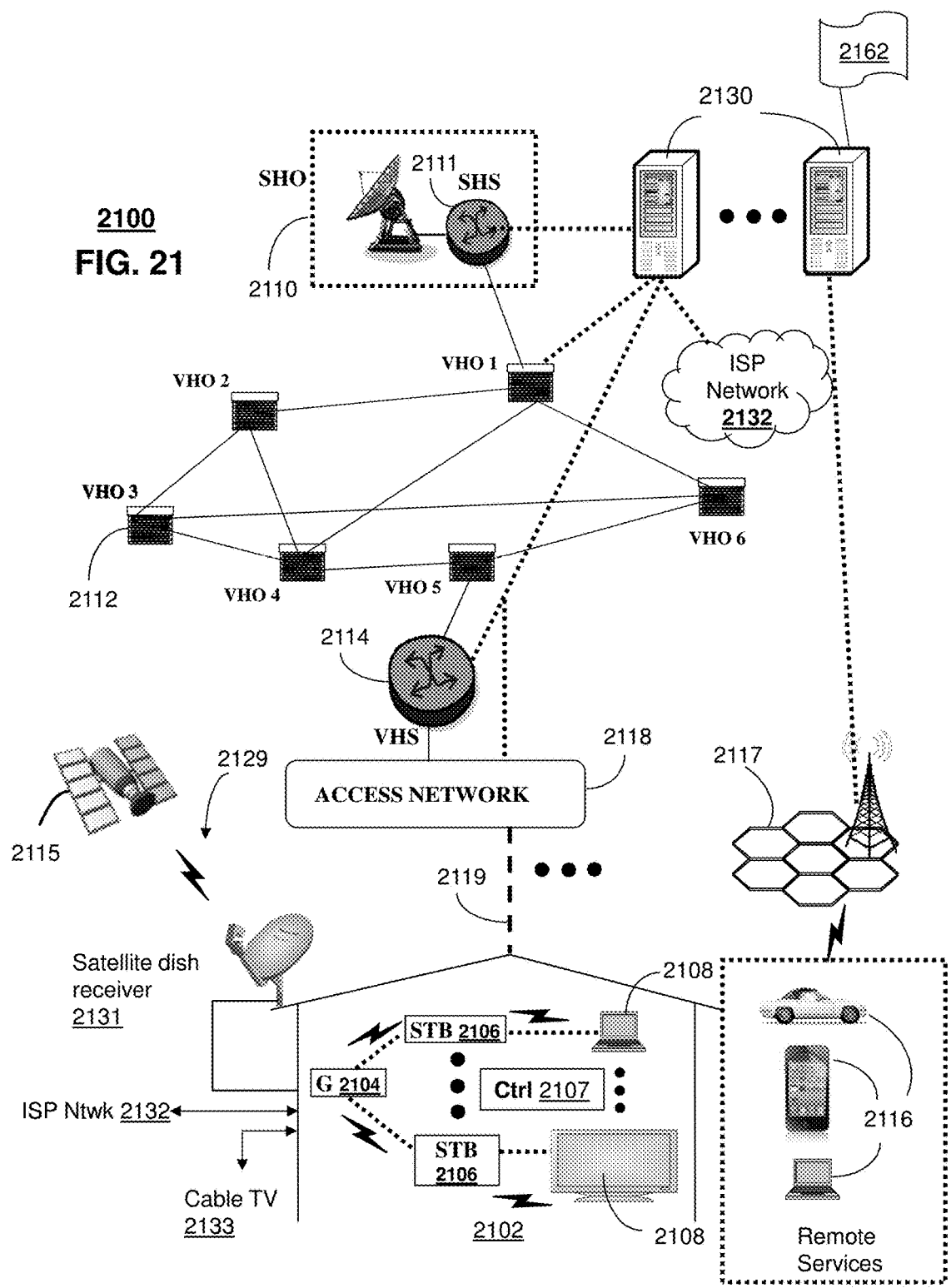
FIGS. 21-22 depict illustrative embodiments of communication systems that provide wireless media services with handovers based on mobility speed group assignments.

FIG. 21 depicts an illustrative embodiment of a first communication system 2100 for delivering media content. The communication system 2100 can represent an Internet Protocol Television (IPTV) media system. Communication system 2100 can be overlaid or operably coupled with system 100 of FIG. 1 as another representative embodiment of communication system 2100. System 2100 can provide for wireless services to mobile devices where handovers are managed based on the speed and acceleration of the mobile devices. System 2100 enables detecting a mobile communication device having a radio resource control connection with a wireless network; monitoring a speed and an acceleration of the mobile communication device in a serving cell of the wireless network; and selecting a first mobility speed group from among a plurality of mobility speed groups based on the speed and the acceleration of the mobile communication device. Handover parameters can be assigned to each speed group of the plurality of mobility speed groups, where the handover parameters facilitate a handover by the wireless network from the serving cell to a target cell. In one embodiment, the monitoring of the speed and the acceleration of the mobile communication device can be commenced responsive to a determination of a first triggering event, where the first triggering event occurs prior to a first handover for the radio resource control connection between the mobile communication device and the wireless network.

In one embodiment, system 2100 enables monitoring for a first triggering event associated with the mobile communication device, where the monitoring of the speed and the acceleration of the mobile communication device is commenced responsive to the first triggering event, and where the monitoring for the first triggering event is based on average path loss measurements at the serving cell, signal quality measurements at the serving cell, load measurements at the serving cell, a measurement of radio link failures for incoming handovers at a neighboring cell, a measurement of session retainability at the serving cell, a measurement of handover performance at the serving cell, a measurement of throughput at the serving cell, a measurement of latency at the serving cell, or a combination thereof. In one embodiment, the monitoring of the speed and the acceleration of the mobile communication device can be based on determining a Doppler frequency offset according to phase differences of reference symbols received by the processor, measuring a fast fading change associated with the radio resource control connection between the mobile communication device and the wireless network, or a combination thereof. In one embodiment, a threshold number of measurements of the speed and the acceleration of the mobile communication device can be performed prior to the selecting of the first mobility speed group.

In one embodiment, system 2100 enables detecting a change in the speed, the acceleration or a combination thereof; identifying a last change of speed group for the mobile communication device; determining a time period associated with the last change; and selecting a second mobility speed group from among the plurality of mobility speed groups based on the change and responsive to the time period satisfying a minimum threshold time between speed group changes. In one embodiment, the system 210 enables monitoring for a second triggering event associated with the mobile communication device; and responsive to the second triggering event, ceasing the monitoring of the speed and the acceleration of the mobile communication device, where the monitoring for the second triggering event is based on average path loss measurements, signal quality measurements, cell load measurements, a measurement of radio link failures for incoming handovers, or a combination thereof.

The IPTV media system can include a super head-end office (SHO) 2110 with at least one super headend office server (SHS) 2111 which receives media content from satellite and/or terrestrial communication systems. In the present context, media content can represent, for example, audio content, moving image content such as 2D or 3D videos, video games, virtual reality content, still image content, and combinations thereof. The SHS server 2111 can forward packets associated with the media content to one or more video head-end servers (VHS) 2114 via a network of video head-end offices (VHO) 2112 according to a multicast communication protocol.

The VHS 2114 can distribute multimedia broadcast content via an access network 2118 to commercial and/or residential buildings 2102 housing a gateway 2104 (such as a residential or commercial gateway). The access network 2118 can represent a group of digital subscriber line access multiplexers (DSLAMs) located in a central office or a service area interface that provide broadband services over fiber optical links or copper twisted pairs 2119 to buildings 2102. The gateway 2104 can use communication technology to distribute broadcast signals to media processors 2106 such as Set-Top Boxes (STBs) which in turn present broadcast channels to media devices 2108 such as computers or television sets managed in some instances by a media controller 2107 (such as an infrared or RF remote controller).

The gateway 2104, the media processors 2106, and media devices 2108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 2106 and subsystems of the IPTV media system for services such as video-on-demand (VoD), browsing an electronic programming guide (EPG), or other infrastructure services.

A satellite broadcast television system 2129 can be used in the media system of FIG. 21. The satellite broadcast television system can be overlaid, operably coupled with, or replace the IPTV system as another representative embodiment of communication system 2100. In this embodiment, signals transmitted by a satellite 2115 that include media content can be received by a satellite dish receiver 2131 coupled to the building 2102. Modulated signals received by the satellite dish receiver 2131 can be transferred to the media processors 2106 for demodulating, decoding, encoding, and/or distributing broadcast channels to the media devices 2108. The media processors 2106 can be equipped with a broadband port to an Internet Service Provider (ISP) network 2132 to enable interactive services such as VoD and EPG as described above.

In yet another embodiment, an analog or digital cable broadcast distribution system such as cable TV system 2133 can be overlaid, operably coupled with, or replace the IPTV system and/or the satellite TV system as another representative embodiment of communication system 2100. In this embodiment, the cable TV system 2133 can also provide Internet, telephony, and interactive media services.

The subject disclosure can apply to other present or next generation over-the-air and/or landline media content services system.

Some of the network elements of the IPTV media system can be coupled to one or more computing devices 2130, a portion of which can operate as a web server for providing web portal services over the ISP network 2132 to wireline media devices 2108 or wireless communication devices 2116.

Communication system 2100 can also provide for all or a portion of the computing devices 2130 to function as a handover management server (herein referred to as server 2130). The server 2130 can use computing and communication technology to perform function 2162, which can include among other things, determining speed and acceleration for end user devices (e.g., based on Doppler frequency), assigning the end user devices to a select speed group from among a plurality of mobility speed groups, and/or performing handover procedures based on parameters and/or policies associated with the select speed group. In one or more embodiments, the wireless communication devices 2116 do not need to be provisioned with functions to enable server 2130 to assign the speed group to the devices.

Multiple forms of media services can be offered to media devices over landline technologies such as those described above. Additionally, media services can be offered to media devices by way of a wireless access base station 2117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, IEEE 802.11 a/b/g/n/ac/ad and so on. Other present and next generation wide area wireless access network technologies can be used in one or more embodiments of the subject disclosure.

Figure 22:
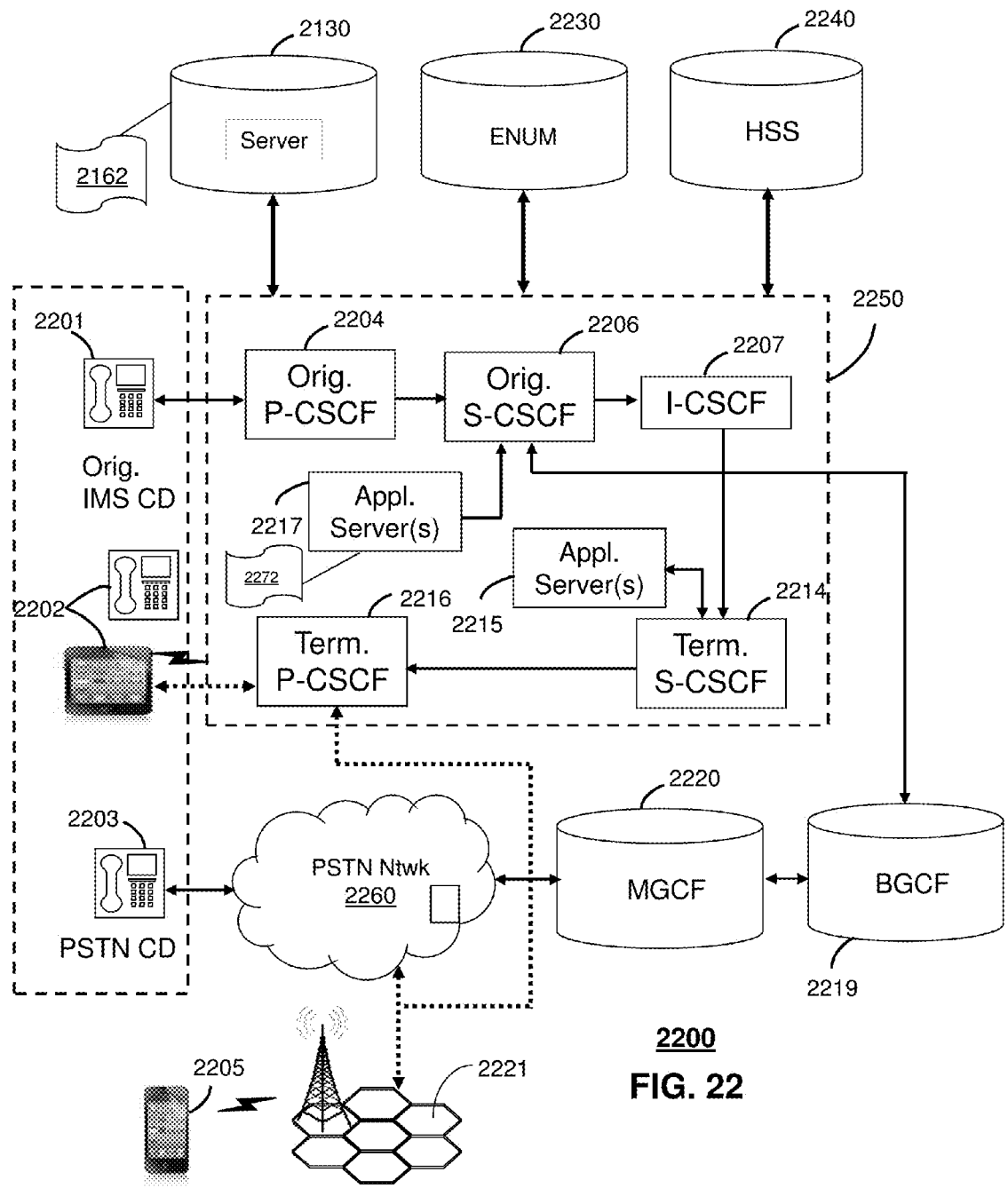

FIG. 22 depicts an illustrative embodiment of a communication system 2200 employing an IP Multimedia Subsystem (IMS) network architecture to facilitate the combined services of circuit-switched and packet-switched systems. Communication system 2200 can be overlaid or operably coupled with system 100 of FIG. 1 and communication system 2100 as another representative embodiment of communication system 2100. System 2200 enables monitoring a speed and an acceleration of a mobile communication device in a serving cell of a wireless network, where the mobile communication device has a radio resource control connection with the wireless network. System 2200 also enables selecting a first mobility speed group from among a plurality of mobility speed groups based on the speed and the acceleration of the mobile communication device, where handover parameters are assigned to each speed group of the plurality of mobility speed groups, and where the handover parameters facilitate a handover by the wireless network from the serving cell to a target cell. In one embodiment, system 2200 enables the monitoring of the speed and the acceleration of the mobile communication device based on a Doppler frequency associated with the radio resource control connection between the mobile communication device and the wireless network. In one embodiment, system 2200 enables the monitoring of the speed and the acceleration of the mobile communication device to be commenced responsive to a determination of a first triggering event, where the determination of the first triggering event is based on average path loss measurements at the serving cell, signal quality measurements at the serving cell, load measurements at the serving cell, a measurement of radio link failures for incoming handovers at a neighboring cell, a measurement of session retainability at the serving cell, a measurement of handover performance at the serving cell, a measurement of throughput at the serving cell, a measurement of latency at the serving cell, or a combination thereof. In one embodiment, a threshold number of measurements of the speed and the acceleration of the mobile communication device can be performed prior to the selecting of the first mobility speed group. In one embodiment, system 2200 enables detecting a change in the speed, the acceleration or a combination thereof; identifying a last change of speed group for the mobile communication device; determining a time period associated with the last change; and selecting a second mobility speed group from among the plurality of mobility speed groups based on the change and responsive to the time period satisfying a minimum threshold time between speed group changes.

Communication system 2200 can comprise a Home Subscriber Server (HSS) 2240, a tElephone NUmber Mapping (ENUM) server 2230, and other network elements of an IMS network 2250. The IMS network 2250 can establish communications between IMS-compliant communication devices (CDs) 2201, 2202, Public Switched Telephone Network (PSTN) CDs 2203, 2205, and combinations thereof by way of a Media Gateway Control Function (MGCF) 2220 coupled to a PSTN network 2260. The MGCF 2220 need not be used when a communication session involves IMS CD to IMS CD communications. A communication session involving at least one PSTN CD may utilize the MGCF 2220.

IMS CDs 2201, 2202 can register with the IMS network 2250 by contacting a Proxy Call Session Control Function (P-CSCF) which communicates with an interrogating CSCF (I-CSCF), which in turn, communicates with a Serving CSCF (S-CSCF) to register the CDs with the HSS 2240. To initiate a communication session between CDs, an originating IMS CD 2201 can submit a Session Initiation Protocol (SIP INVITE) message to an originating P-CSCF 2204 which communicates with a corresponding originating S-CSCF 2206. The originating S-CSCF 2206 can submit the SIP INVITE message to one or more application servers (ASs) 2217 that can provide a variety of services to IMS subscribers.

For example, the application servers 2217 can be used to perform originating call feature treatment functions on the calling party number received by the originating S-CSCF 2206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 2206 can submit queries to the ENUM system 2230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 2207 to submit a query to the HSS 2240 to identify a terminating S-CSCF 2214 associated with a terminating IMS CD such as reference 2202. Once identified, the I-CSCF 2207 can submit the SIP INVITE message to the terminating S-CSCF 2214. The terminating S-CSCF 2214 can then identify a terminating P-CSCF 2216 associated with the terminating CD 2202. The P-CSCF 2216 may then signal the CD 2202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 22 may be interchangeable. It is further noted that communication system 2200 can be adapted to support video conferencing. In addition, communication system 2200 can be adapted to provide the IMS CDs 2201, 2202 with the multimedia and Internet services of communication system 2100 of FIG. 21.

If the terminating communication device is instead a PSTN CD such as CD 2203 or CD 2205 (in instances where the cellular phone only supports circuit-switched voice communications), the ENUM system 2230 can respond with an unsuccessful address resolution which can cause the originating S-CSCF 2206 to forward the call to the MGCF 2220 via a Breakout Gateway Control Function (BGCF) 2219. The MGCF 2220 can then initiate the call to the terminating PSTN CD over the PSTN network 2260 to enable the calling and called parties to engage in voice and/or data communications.

It is further appreciated that the CDs of FIG. 22 can operate as wireline or wireless devices. For example, the CDs of FIG. 22 can be communicatively coupled to a cellular base station 2221, a femtocell, a WiFi router, a Digital Enhanced Cordless Telecommunications (DECT) base unit, or another suitable wireless access unit to establish communications with the IMS network 2250 of FIG. 22. The cellular access base station 2221 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 22.

Cellular phones supporting LTE can support packet-switched voice and packet-switched data communications and thus may operate as IMS-compliant mobile devices. In this embodiment, the cellular base station 2221 may communicate directly with the IMS network 2250 as shown by the arrow connecting the cellular base station 2221 and the P-CSCF 2216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 2130 of FIG. 21 can be operably coupled to the second communication system 2200 for purposes similar to those described above. Server 2130 can perform function 2162 and thereby provide speed group-based handovers for the CDs 2202 and 2205 of FIG. 22. Server 2130 can be an integral part of the application server(s) 2217 performing function 2272, which can be substantially similar to function 2162 and adapted to the operations of the IMS network 2250 or the server 2130 can be a separate device.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 23:
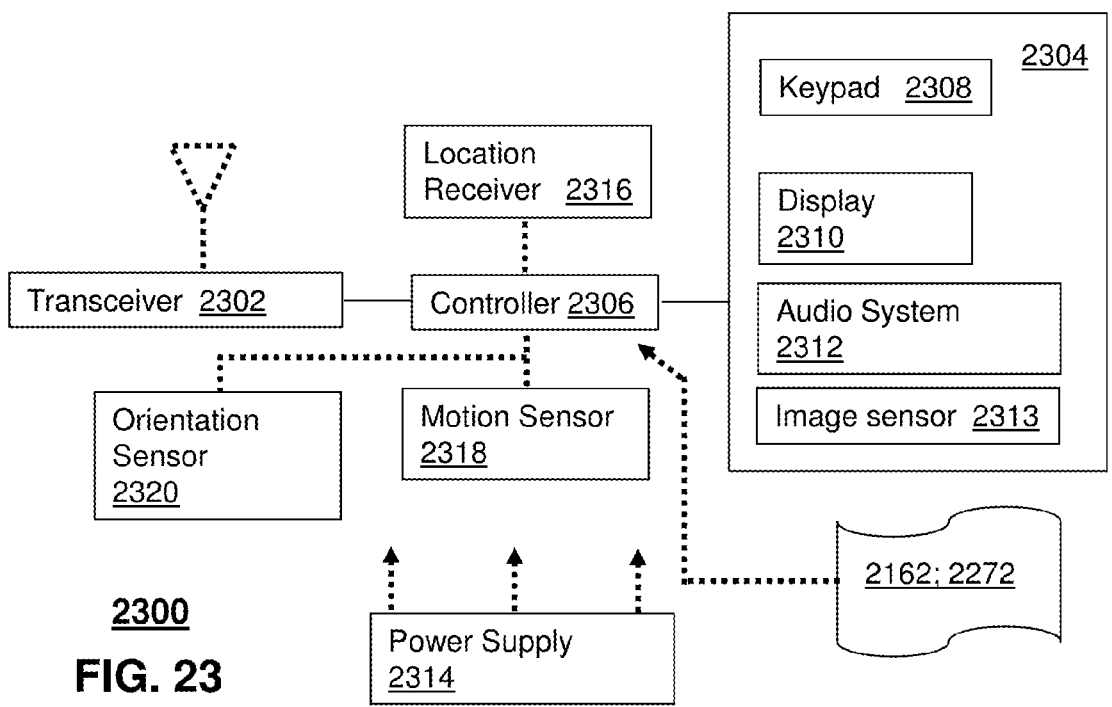
FIG. 23 depicts an illustrative embodiment of a communication device.

FIG. 23 depicts an illustrative embodiment of a communication device 2300. Communication device 2300 can serve in whole or in part as an illustrative embodiment of the devices depicted in FIGS. 21-22. In one embodiment, device 2300 can be a mobile device that is in an RRC CONNECTION mode and moving through a cell. In this example, device 2300 can be provided with wireless services including one or more handovers that are according to a network-based speed and acceleration. Continuing with this example, the device 2300 does not need to be provided with additional functionality in order for speed group-based handovers since the network (e.g., the eNodeB) can estimate the speed and acceleration of the device based on various techniques (e.g., analysis of the Doppler effect) that don't require utilizing the resources of the device for calculating the speed and acceleration. In one embodiment, device 2300 can be a server or other network element that performs the speed group-based handovers, such as determining speed and acceleration for end user devices (e.g., based on Doppler frequency), assigning the end user devices to a select speed group from among a plurality of mobility speed groups, and/or performing handover procedures based on parameters and/or policies associated with the select speed group.

To enable these features, communication device 2300 can comprise a wireline and/or wireless transceiver 2302 (herein transceiver 2302), a user interface (UI) 2304, a power supply 2314, a location receiver 2316, a motion sensor 2318, an orientation sensor 2320, and a controller 2306 for managing operations thereof. The transceiver 2302 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 2302 can also be adapted to support circuit-switched wireline access technologies (such as PSTN), packet-switched wireline access technologies (such as TCP/IP, VoIP, etc.), and combinations thereof.

The UI 2304 can include a depressible or touch-sensitive keypad 2308 with a navigation mechanism such as a roller ball, a joystick, a mouse, or a navigation disk for manipulating operations of the communication device 2300. The keypad 2308 can be an integral part of a housing assembly of the communication device 2300 or an independent device operably coupled thereto by a tethered wireline interface (such as a USB cable) or a wireless interface supporting for example Bluetooth. The keypad 2308 can represent a numeric keypad commonly used by phones, and/or a QWERTY keypad with alphanumeric keys. The UI 2304 can further include a display 2310 such as monochrome or color LCD (Liquid Crystal Display), OLED (Organic Light Emitting Diode) or other suitable display technology for conveying images to an end user of the communication device 2300. In an embodiment where the display 2310 is touch-sensitive, a portion or all of the keypad 2308 can be presented by way of the display 2310 with navigation features.

The display 2310 can use touch screen technology to also serve as a user interface for detecting user input. As a touch screen display, the communication device 2300 can be adapted to present a user interface with graphical user interface (GUI) elements that can be selected by a user with a touch of a finger. The touch screen display 2310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 2310 can be an integral part of the housing assembly of the communication device 2300 or an independent device communicatively coupled thereto by a tethered wireline interface (such as a cable) or a wireless interface.

The UI 2304 can also include an audio system 2312 that utilizes audio technology for conveying low volume audio (such as audio heard in proximity of a human ear) and high volume audio (such as speakerphone for hands free operation). The audio system 2312 can further include a microphone for receiving audible signals of an end user. The audio system 2312 can also be used for voice recognition applications. The UI 2304 can further include an image sensor 2313 such as a charged coupled device (CCD) camera for capturing still or moving images.

The power supply 2314 can utilize common power management technologies such as replaceable and rechargeable batteries, supply regulation technologies, and/or charging system technologies for supplying energy to the components of the communication device 2300 to facilitate long-range or short-range portable applications. Alternatively, or in combination, the charging system can utilize external power sources such as DC power supplied over a physical interface such as a USB port or other suitable tethering technologies.

The location receiver 2316 can utilize location technology such as a global positioning system (GPS) receiver capable of assisted GPS for identifying a location of the communication device 2300 based on signals generated by a constellation of GPS satellites, which can be used for facilitating location services such as navigation. The motion sensor 2318 can utilize motion sensing technology such as an accelerometer, a gyroscope, or other suitable motion sensing technology to detect motion of the communication device 2300 in three-dimensional space. The orientation sensor 2320 can utilize orientation sensing technology such as a magnetometer to detect the orientation of the communication device 2300 (north, south, west, and east, as well as combined orientations in degrees, minutes, or other suitable orientation metrics).

The communication device 2300 can use the transceiver 2302 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 2306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 2300.

Other components not shown in FIG. 23 can be used in one or more embodiments of the subject disclosure. For instance, the communication device 2300 can include a reset button (not shown). The reset button can be used to reset the controller 2306 of the communication device 2300. In yet another embodiment, the communication device 2300 can also include a factory default setting button positioned, for example, below a small hole in a housing assembly of the communication device 2300 to force the communication device 2300 to re-establish factory settings. In this embodiment, a user can use a protruding object such as a pen or paper clip tip to reach into the hole and depress the default setting button. The communication device 2300 can also include a slot for adding or removing an identity module such as a Subscriber Identity Module (SIM) card. SIM cards can be used for identifying subscriber services, executing programs, storing subscriber data, and so forth.

The communication device 2300 as described herein can operate with more or less of the circuit components shown in FIG. 23. These variant embodiments can be used in one or more embodiments of the subject disclosure.

The communication device 2300 can be adapted to perform the functions of the media processor 2106, the media devices 2108, or the portable communication devices 2116 of FIG. 21, as well as the IMS CDs 2201-2202 and PSTN CDs 2203-2205 of FIG. 5. It will be appreciated that the communication device 2300 can also represent other devices that can operate in communication systems 2100-2200 of FIGS. 21-22 such as a gaming console and a media player.

The communication device 2300 shown in FIG. 23 or portions thereof can serve as a representation of one or more of the devices of system 100 of FIG. 1, communication system 2100, and communication system 2200. In addition, the controller 2306 can be adapted in various embodiments to perform the functions 2162 and 2272, respectively.

Upon reviewing the aforementioned embodiments, it would be evident to an artisan with ordinary skill in the art that said embodiments can be modified, reduced, or enhanced without departing from the scope of the claims described below. For example, historical data associated with a serving cell can be used in determining which speed group to which an end user device should be assigned. For example, historical data indicating that a serving cell provides coverage to an area that historically has stop and go traffic can be used to adjust the number of speed and acceleration measurements to be obtained (e.g., sample size) before a speed group change is implemented. In other embodiments, the number of speed groups (and their corresponding handover parameters such as different filter coefficient values) can change based on network conditions (e.g., measured or historical conditions). In this example, a larger number of speed groups can be available for assignment under first network conditions and a smaller number of speed groups can be available for assignment under second network conditions. In one or more embodiments, the functions described in the exemplary embodiments can be performed in a distributed environment, such as the eNodeB determining the speed and acceleration for end user devices (e.g., based on Doppler frequency), while another device performs assigning of the end user devices to a select speed group from among a plurality of mobility speed groups, and/or performing handover procedures based on parameters and/or policies associated with the select speed group. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 24:
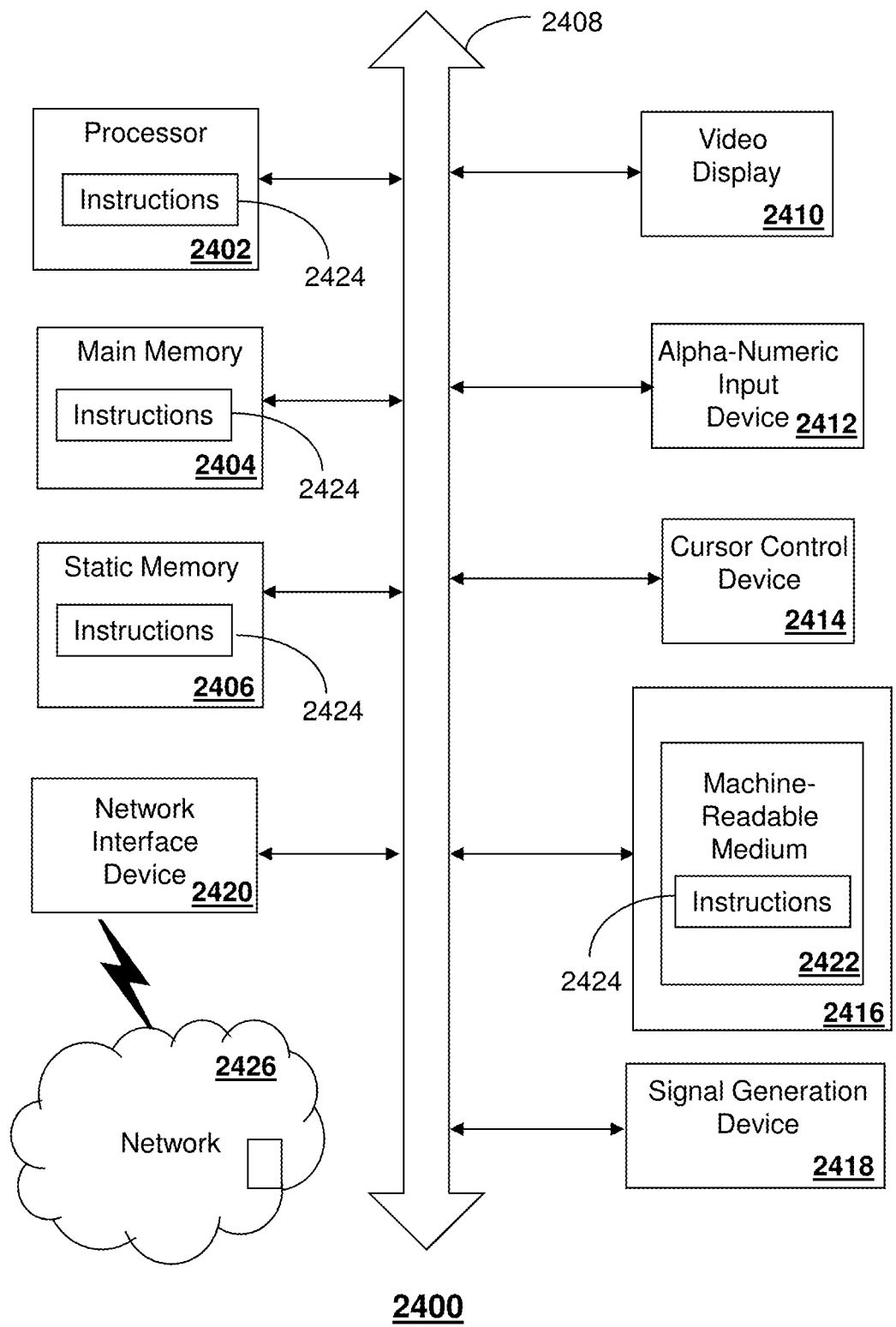
FIG. 24 is a diagrammatic representation of a machine in the form of a computer system within which a set of instructions, when executed, may cause the machine to perform any one or more of the methods described herein.

FIG. 24 depicts an exemplary diagrammatic representation of a machine in the form of a computer system 2400 within which a set of instructions, when executed, may cause the machine to perform any one or more of the methods describe above. One or more instances of the machine can operate, for example, as the server 130 and/or 2130 and other devices of FIGS. 1-3, 5-11 and 21-23. In some embodiments, the machine may be connected (e.g., using a network 2426) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2400 may include a processor (or controller) 2402 (e.g., a central processing unit (CPU), a graphics processing unit (GPU, or both), a main memory 2404 and a static memory 2406, which communicate with each other via a bus 2408. The computer system 2400 may further include a display unit 2410 (e.g., a liquid crystal display (LCD), a flat panel, or a solid state display. The computer system 2400 may include an input device 2412 (e.g., a keyboard), a cursor control device 2414 (e.g., a mouse), a disk drive unit 2416, a signal generation device 2418 (e.g., a speaker or remote control) and a network interface device 2420. In distributed environments, the embodiments described in the subject disclosure can be adapted to utilize multiple display units 2410 controlled by two or more computer systems 2400. In this configuration, presentations described by the subject disclosure may in part be shown in a first of the display units 2410, while the remaining portion is presented in a second of the display units 2410.

The disk drive unit 2416 may include a tangible computer-readable storage medium 2422 on which is stored one or more sets of instructions (e.g., software 2424) embodying any one or more of the methods or functions described herein, including those methods illustrated above. The instructions 2424 may also reside, completely or at least partially, within the main memory 2404, the static memory 2406, and/or within the processor 2402 during execution thereof by the computer system 2400. The main memory 2404 and the processor 2402 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 2400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more steps or functions, where the facilitating (e.g., facilitating access or facilitating establishing a connection) can include less than all of the steps needed to perform the function or can include all of the steps of the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
monitoring, by a system including a processor, repeatedly for a first triggering event associated with a mobile communication device having a radio resource control connection with a serving cell of a wireless network, wherein the first triggering event comprises a path loss of the mobile communication device in the serving cell exceeding a threshold;
determining, by the system, a mobility speed group assignment for the mobile communication device, wherein the mobility speed group assignment is selected from among a plurality of mobility speed groups;
selecting, by the system, a handover policy based on the mobility speed group assignment and a cell size for the serving cell of the wireless network that provides the radio resource control connection, wherein the handover policy includes handover parameter values;
providing the handover parameter values to the mobile communication device via a dedicated signaling message;
associating, by the system, a neighboring cell of a list of neighboring cells with a list of excluded neighboring cells; and
performing, by the system, a handover from the serving cell to a target cell based on the handover policy, wherein the target cell is not on the list of excluded neighboring cells.

2. The method of claim 1, wherein the handover policy includes preventing the handover from a first cell size to a second cell size, wherein the second cell size is smaller than the first cell size.

3. The method of claim 2, comprising:
determining, by the system, a cell type for the serving cell, wherein the handover policy includes preventing the handover between capacity small cells; and
providing, to the mobile communication device by the system, identification information indicating neighboring small cells in proximity to the serving cell, wherein the providing of the identification information is to a group of end user devices having radio resource control connections with the wireless network via the serving cell.

4. The method of claim 1, wherein the handover parameter values include a filter coefficient value to be applied to received signal strength measurements.

5. The method of claim 1, wherein the handover parameter values include a time to trigger value, a discontinuous reception state, or a combination thereof, and wherein the associating of the neighboring cell with the list of excluded neighboring cells is based on one of a type of service or a cell size.

6. The method of claim 1, comprising determining, by the system, a service type for the radio resource control connection, wherein the selecting of the handover policy is based on the service type.

7. The method of claim 1,
wherein the monitoring for the first triggering event is based on average path loss measurements at the serving cell, signal quality measurements at the serving cell, load measurements at the serving cell, a measurement of radio link failures for incoming handovers at a neighboring cell, a measurement of session preservation at the serving cell, a measurement of handover performance at the serving cell, a measurement of throughput at the serving cell, a measurement of latency at the serving cell, or a combination thereof.

8. The method of claim 1, comprising adjusting the handover parameter values that correspond to the mobility speed group assignment based on network conditions.

9. A server comprising:
a memory to store executable instructions; and
a processor coupled with the memory, wherein the processor, responsive to executing the executable instructions, performs operations comprising:
detecting an event trigger that comprises a path loss of a mobile communication device in a serving cell that exceeds a threshold;
determining a mobility speed group assignment for the mobile communication device having a radio resource control connection with a wireless network by way of the serving cell, wherein the mobility speed group assignment is selected from among a plurality of mobility speed groups;
selecting a handover policy based on the mobility speed group;
identifying a neighboring cell from a list of neighboring cells with a list of excluded neighboring cells; and
providing the handover policy having handover parameter values to the mobile communication device via a dedicated signaling message, wherein a handover from the serving cell to a target cell of the list of neighboring cells is based on the handover policy, wherein the target cell is not on the list of excluded neighboring cells.

10. The server of claim 9, wherein the processor comprises a plurality of processors operating in a distributed processing environment.

11. The server of claim 9, wherein the operations further comprise performing the handover from the serving cell to the target cell based on the handover policy.

12. The server of claim 9, wherein the operations further comprise:
monitoring for a first triggering event associated with the mobile communication device, wherein the monitoring for the first triggering event is based on average path loss measurements at the serving cell, signal quality measurements at the serving cell, load measurements at the serving cell, a measurement of radio link failures for incoming handovers at a neighboring cell, a measurement of session retainability at the serving cell, a measurement of handover performance at the serving cell, a measurement of throughput at the serving cell, a measurement of latency at the serving cell, or a combination thereof.

13. The server of claim 9, wherein the operations further comprise facilitating transfer of a dedicated message comprising a speed-based policy parameter to the mobile communication device, wherein the handover policy includes preventing a handover from a first cell size to a second cell size, wherein the second cell size is smaller than the first cell size.

14. The server of claim 9, comprising:
determining a cell type for the serving cell, wherein the handover policy includes preventing a handover between capacity small cells; and
providing, to the mobile communication device, identification information indicating neighboring small cells in proximity to the serving cell, wherein the providing of the identification information is to a group of end user devices having radio resource control connections with the wireless network via the serving cell.

15. The server of claim 9, wherein the handover parameter values include a filter coefficient value to be applied to received signal strength measurements, a time to trigger value, a discontinuous reception state, or a combination thereof.

16. The server of claim 9, wherein the operations further comprise determining a service type for the radio resource control connection, wherein the selecting of the handover policy is based on the service type.

17. A non-transitory machine-readable storage device comprising executable instructions, which, responsive to being executed by a processor cause the processor to perform operations comprising:

determining a mobility speed group assignment for a mobile communication device having a radio resource control connection with a wireless network, wherein the mobility speed group assignment is selected from among a plurality of mobility speed groups according to a speed, an acceleration or both of the mobile communication device, and wherein the speed, the acceleration or both of the mobile communication device are determined in response to a detection of a triggering event that comprises a path loss of the mobile communication device with a serving cell in the wireless network exceeding a threshold;

determining a neighboring cell from a list of neighboring cells as being a member of a group of excluded cells based on a cell type of the serving cell; and selecting a handover policy based on the mobility speed group assignment, wherein a target cell is on the list of neighboring cells, excluding the group of excluded cells.

18. The non-transitory machine-readable storage device of claim 17, wherein the processor comprises a plurality of processors operating in a distributed processing environment.

19. The non-transitory machine-readable storage device of claim 17, wherein the operations further comprise determining a service type for the radio resource control connection, wherein the selecting of the handover policy is based on the service type.

20. The non-transitory machine-readable storage device of claim 17, wherein detection of the triggering event is further based on average path loss measurements at the serving cell, signal quality measurements at the serving cell, load measurements at the serving cell, a measurement of radio link failures for incoming handovers at a neighboring cell, a measurement of session preservation at the serving cell, a measurement of handover performance at the serving cell, a measurement of throughput at the serving cell, a measurement of latency at the serving cell, or a combination thereof.

* * * * *